(12) United States Patent
Kishimoto et al.

(10) Patent No.: US 9,037,927 B2
(45) Date of Patent: May 19, 2015

(54) EVENT NOTIFICATION SYSTEM, EVENT INFORMATION AGGREGATION SERVER, AND EVENT NOTIFICATION METHOD

(71) Applicant: Hitachi, Ltd., Tokyo (JP)

(72) Inventors: Toshimichi Kishimoto, Hadano (JP); Shinichiro Kanno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 13/641,929

(22) PCT Filed: Oct. 4, 2012

(86) PCT No.: PCT/JP2012/006406
§ 371 (c)(1),
(2) Date: Nov. 26, 2012

(87) PCT Pub. No.: WO2014/054076
PCT Pub. Date: Apr. 10, 2014

(65) Prior Publication Data
US 2014/0101497 A1   Apr. 10, 2014

(51) Int. Cl.
| | |
|---|---|
| G06F 11/32 | (2006.01) |
| G06F 11/16 | (2006.01) |
| G06F 11/07 | (2006.01) |
| G06F 11/30 | (2006.01) |

(Continued)

(52) U.S. Cl.
CPC ........ *G06F 11/1666* (2013.01); *G06F 11/0727* (2013.01); *G06F 11/0787* (2013.01); *G06F 11/3034* (2013.01); *G06F 11/3065* (2013.01); *G06F 11/324* (2013.01); *G06F 11/327* (2013.01); *H04L 43/045* (2013.01); *H04L 43/0817* (2013.01); *H04L 67/1097* (2013.01)

(58) Field of Classification Search
CPC .................. G06F 11/0766; G06F 11/0871
USPC .................................. 714/48, 54, 57
See application file for complete search history.

(56) References Cited

U.S. PATENT DOCUMENTS

| | | | |
|---|---|---|---|
| 5,689,416 A | 11/1997 | Shimizu et al. | |
| 2005/0015685 A1* | 1/2005 | Yamamoto | 714/54 |
| 2005/0131937 A1* | 6/2005 | Parkyn | 707/103 R |

(Continued)

FOREIGN PATENT DOCUMENTS

| | | |
|---|---|---|
| EP | 1 494 118 | 1/2005 |
| JP | 2011-117629 A | 6/2011 |
| JP | 2011-175357 A | 9/2011 |

*Primary Examiner* — Chae Ko
(74) *Attorney, Agent, or Firm* — Volpe and Koenig, P.C.

(57) ABSTRACT

Events which have occurred in storage systems can be managed easily regardless of complexity of a storage configuration.
An event notification system 1 includes: an event notifying client 133 for detecting the occurrence of an event(s) in volumes of a storage system 10; a management application server 20 for storing information about the occurred event as setting/failure information 21; and an event information aggregation server 30 for creating and managing event information 31 including an event key 311 for associating the occurred event with the setting/failure information 21. When the event information aggregation server 30 in such an event notification system 1 notifies an administrator terminal 50 of the event key 311 and an administrator selects the event key 311, the management application server 20 has the administrator terminal 50 display an event browse screen 52 indicating the relativity of a volume, in which the event occurred, to a volume in which a related event occurred.

15 Claims, 23 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 2006/0072476 A1* | 4/2006 | Sirivara et al. | 370/252 |
| 2007/0086351 A1* | 4/2007 | Noble et al. | 370/244 |
| 2007/0174721 A1* | 7/2007 | Yamamoto et al. | 714/42 |
| 2007/0271377 A1* | 11/2007 | Yamamoto et al. | 709/224 |
| 2010/0122125 A1* | 5/2010 | Yamamoto et al. | 714/57 |
| 2011/0127027 A1 | 6/2011 | Kashirajima et al. | |
| 2011/0314330 A1 | 12/2011 | Morimura et al. | |
| 2012/0030346 A1 | 2/2012 | Fukuda et al. | |
| 2012/0233316 A1 | 9/2012 | Nakajima | |

* cited by examiner

FIG.15

[EVENT INFORMATION]

EVENT KEY: Set_Pool_A_20120326

EVENT ID: 1

EVENT TYPE: SETTING CHANGE (MANUAL)

EVENT REGION: S/N 0001 Pool(1)

EVENT OCCURRENCE TIME: 2012/03/26 01:06.020

[AUDIT LOG INFORMATION]

SETTING CONTENT: POOL EXTENSION

POOL ID=01: Pool VOL=00:01/00:02/00:03

[DETAILED EVENT INFORMATION DISPLAY]

https://IP/event_service.jsp?eid=0001

EVENT NOTIFICATION SYSTEM, EVENT INFORMATION AGGREGATION SERVER, AND EVENT NOTIFICATION METHOD

TECHNICAL FIELD

The present invention relates to an event notification system, an event information aggregation server, and an event notification method and is suited for use in the event notification system, event information aggregation server, and event notification method for reporting the occurrence of events in storage systems.

BACKGROUND ART

Recently, the scale of computer systems has been expanding and the computer systems have become more complicated by mutually connecting information processing units for, for example, a plurality of storage systems to the computer systems via a network.

If the configuration of an information processing unit is set or changed, an administrator of a computer system needs to check information indicating the content of the setting or change (setting information); and if a failure occurs in the information processing unit, the administrator needs to check information indicating the content of the failure (failure information). Examples of a method for the administrator of the computer system for checking the setting information and the failure information include a method of referring to an audit log and a method of referring to event information reported based on the setting or change of the configuration information and the occurrence of a failure.

However, generally, the audit log is often some kind data indicating an operation history of the information processing unit which has been accumulated as text data, so that it is hard to understand the detained setting content of the configuration information. Also, it is difficult to understand the relationship between the information processing units only from the audit log, so that the administrator cannot manage the computer system in consideration of the mutual influence upon the information processing units in the entire computer system by the method of only referring to the audit log.

On the other hand, PTL 1 discloses a management apparatus capable of executing analysis processing efficiently by using a working memory of a constant size as an example of a technique to provide the administrator with event information. The management apparatus disclosed in PTL 1 is characterized in that it divides one or more previously defined rules into one or more rule segments, each of which is composed of conditions and conclusions constituting the relevant rules and stores, and the rule segments obtained as a result of the division are stored in a secondary storage device; and when receiving an event notice from an information processing unit, the management apparatus selects one or more related rule segments, constructs a rule analysis network indicating the relationship between the rules in the relevant memory by coupling the one or more selected rule segments in the memory as necessary, derives an inference based on the constructed rule analysis network, and deletes the rule segments, which can be hardly used for derivation of the inference, from the memory, thereby maintaining a constant working memory size regardless of the number of defined events and the number of rules for the target system and implementing efficient analysis processing.

Furthermore, for example, PTL 2 discloses an event notification system that can be restored by an administrator promptly when a failure occurs. The event notification system disclosed in PTL 2 is characterized in that it detects the occurrence of a specified event (various events such as the occurrence of a failure) from the status of a management system by immediately preparing e-mail from the status of process parameters and notifying the administrator of the specified event, reports the event promptly and accurately by using e-mail, and supports appropriate and easy operations for this event.

CITATION LIST

Patent Literature

[PTL 1]
Japanese Patent Application Laid-Open (Kokai) Publication No. 2011-175357
[PTL 2]
Japanese Patent Application Laid-Open (Kokai) Publication No. 2001-117629

SUMMARY OF INVENTION

Technical Problem

However, with the management apparatus disclosed in PTL 1, a management server derives an inference with regard to an event registered in the management server based on a rule that is highly related to the event; and if a large number of events are reported in a large-scaled computer system, an inference is derived for each of the large number of events. When this happens, the administrator has to organize many reported event notices and the inferences; and when they select only necessary information from those event notices and inferences, there is a problem of further complicated work required.

Furthermore, when detecting the occurrence of an event, the event notification system disclosed in PTL 2 reports the event promptly and accurately by using e-mail and supports appropriate and easy operations for the event, but it does not accumulate event notices themselves like the management apparatus disclosed in PTL 1. So, when a large number of events are reported in the large-scale computer system, the problem is that the administrator needs to handle complicated work, that is, organizing and sorting out the events. Moreover, the event notification system disclosed in PTL 2 requires registration of mail addresses in order to receive e-mail, so that a task to manage user accounts is also required.

Furthermore, when a plurality of events occur, the management apparatus disclosed in PTL 1 and the event notification system disclosed in PTL 2 cannot clearly indicates the relativity between the events. So, the problem is that it is difficult for them to manage the events appropriately in consideration of the mutual influence upon the information processing units in the system.

The present invention was devised in consideration of the above-described circumstance and aims at suggesting an event notification system, event information aggregation server, and event notification method capable of easily managing events, which have occurred in storage systems, regardless of complexity of a storage configuration.

Solution to Problem

In order to solve the above-described problems, an event notification system including: an administrator terminal operated by an administrator; a plurality of storage systems; an event notifying client for detecting the occurrence of an event in a first volume included in the storage systems; a management application server for obtaining information relating to the occurrence of the event from the storage systems and storing it as setting/failure information; and an event information aggregation server for creating and managing event information including an event key for uniquely associating the event with the setting/failure information is provided according to the present invention; wherein the event information includes related region information about a second volume that is an occurrence region of a related event occurring in relation to the event; wherein the event information aggregation server notifies the administrator terminal of an event key for the event information; and wherein if an event key is selected by the administrator from event keys of which the event information aggregation server notified the administrator terminal, the management application server has the administrator terminal display an event browse screen showing relativity of the first volume to the second volume based on the event information including the relevant event key.

Furthermore, in order to solve the above-described problems, an event information aggregation server connected to a plurality of storage systems configured by including a plurality of volumes, and to an administrator terminal, wherein with respect to an event which has occurred in the volumes included in the storage systems, the event information aggregation server: creates and manages event information including an event key for uniquely associating the event with information about the occurrence of the event; and notifies the administrator terminal of the event key for the event information.

Furthermore, in order to solve the above-described problems, an event notification method for an event notification system, which is connected to a plurality of storage systems, for reporting an event which has occurred in the storage systems is provided according to the present invention; wherein the event notification method includes: an event detection step executed by the event notifying client detecting the occurrence of an event in a first volume included in the storage systems; a setting/failure information storage step executed by the management application server obtaining information about the occurrence of the relevant event from the storage systems and storing it as setting/failure information; an event information creation step executed by the event information aggregation server creating and managing event information including an event key for uniquely associating the event with the setting/failure information by including related region information about a second volume that is an occurrence region of a related event occurring in relation to the event; an event occurrence notification step executed by the event information aggregation server notifying the administrator terminal of an event key for the event information; and an event browse screen display step executed, if an event key is selected by the administrator from reported event keys, by the management application server having the administrator terminal display an event browse screen showing relativity of the first volume to the second volume based on the event information including the relevant event key.

Advantageous Effects of Invention

According to the present invention, events occurred in storage systems can be managed easily regardless of complexity of the storage configuration.

BRIEF DESCRIPTION OF DRAWINGS

FIG. 15 shows a specific example of the event occurrence notice sent to an administrator.

DESCRIPTION OF EMBODIMENTS (1) First Embodiment

An event notification system according to a first embodiment of the present invention is characterized in that when an event occurs in a volume included in storage systems, setting/failure information, which is information about the occurred event and its related event, is stored in a management application server, event information including an event key for uniquely associating the occurred event with the setting/failure information is created and managed by including related region information about a volume, in which the related event of the relevant event occurred, and an administrator terminal is notified of the occurrence of the event including the event key. Furthermore, the event notification system according to the first embodiment is characterized in that regarding an event key selected by the administrator from event keys reported by means of event occurrence notices, the administrator terminal is made to display an event browse screen indicating the relativity of a volume, in which an event occurred first, to a volume, in which its related event occurred, based on the event information including the relevant event key.

(1-1) Configuration of Event Notification System According to this Embodiment

Figure 1:
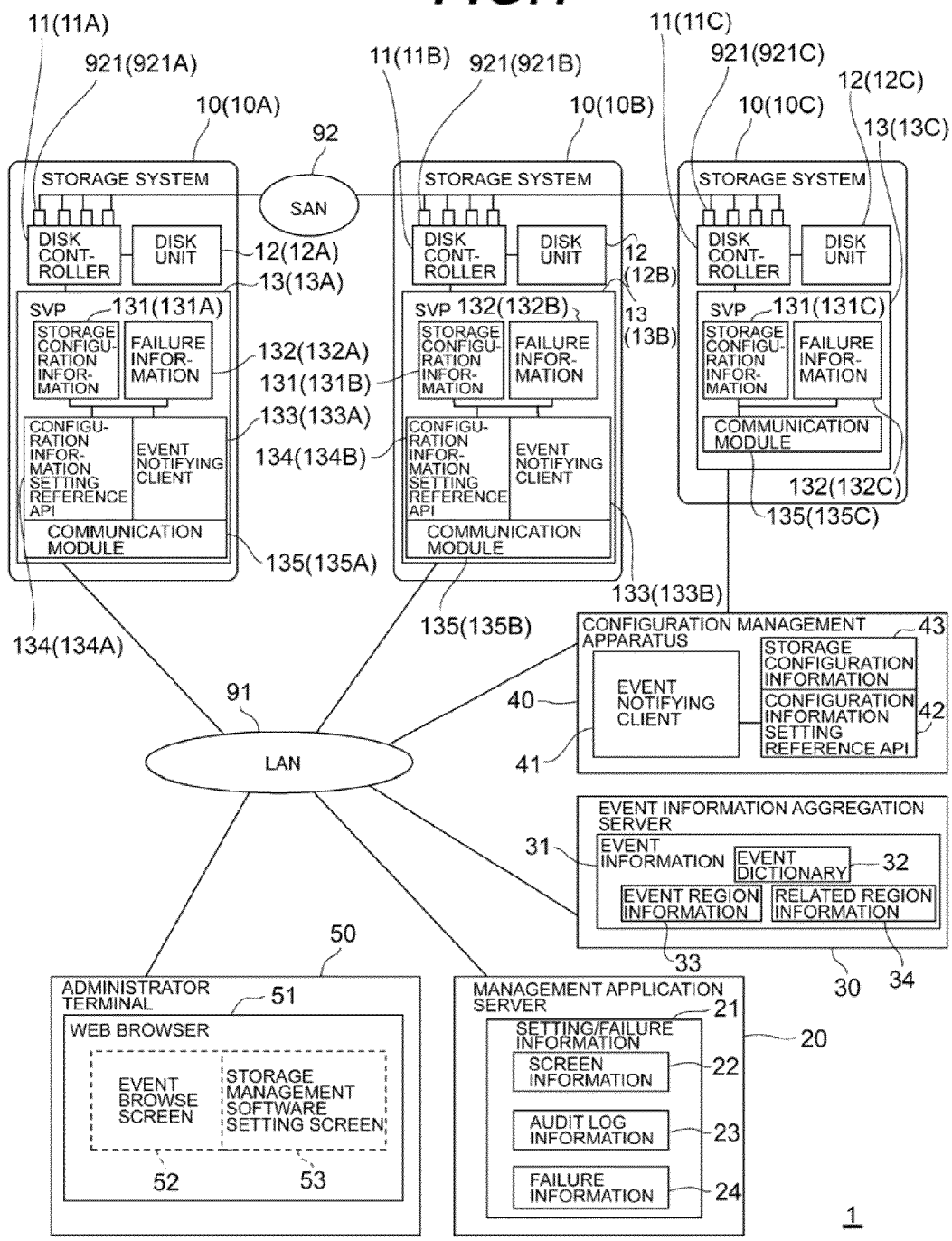
FIG. 1 is a block diagram showing a configuration example of an event notification system according to a first embodiment.

FIG. 1 is a block diagram showing a configuration example of an event notification system according to the first embodiment. As shown in FIG. 1, an event notification system 1 includes a plurality of storage systems 10 (10A to 10C), a management application server 20, an event information aggregation server 30, a configuration management apparatus 40, and an administrator terminal 50. The respective components of the event notification system 1 are connected to each other via a LAN 91. Also, the plurality of storage systems 10A to 10C are connected to each other via a SAN (Storage Area Network) 92 which is connected to fibre ports 921 (921A to 921C) for Fibre Channel.

Each component of the event notification system 1 will be explained below.

(1-1-1) Configuration of Storage System

The storage system 10 is an external storage system that is connected to a server computer (not shown in the drawing), which commands the storage system 10 to input/output data; and the external storage system stores data to be processed by the server computer in storage devices. As shown in FIG. 1, the storage system 10 includes a disk controller 11, a disk unit 12, and an SVP (Service Processor) 13.

The disk controller 11 is a controller for controlling data input to, or output from, the disk unit 12 and the disk unit 12 is a unit equipped with a plurality of disk drives for providing volumes. Furthermore, the SVP 13 is a control device for managing configuration information and failure information of the storage system 10.

As shown in FIG. 1, the SVP 13 (13A, 13B, 13C) has: storage configuration information 131 indicating the storage configuration in the disk unit 12, failure information 132 indicating information about failures which have occurred in volumes in the disk unit 12, and a communication module 135 for communications between programs of the SVP 13 and external programs (for example, programs of the management application server 20, the event information aggregation server 30, and the configuration management apparatus 40). Then, particularly each of the SVP 13A and the SVP 13B is configured by further including an event notifying client 133 (133A, 133B) for detecting the occurrence of a specified event in the storage system 10 and a configuration information setting reference API 134 (134A, 134B) for referring to the storage configuration information 131. The functional difference between the SVPs 13A, 13B and the SVP 13C due to their configuration difference will be explained later; however, unless specifically described in this embodiment, the SVP 13 will be explained by referring to the configuration of the SVP 13A and the SVP 13B as a model.

Figure 2:
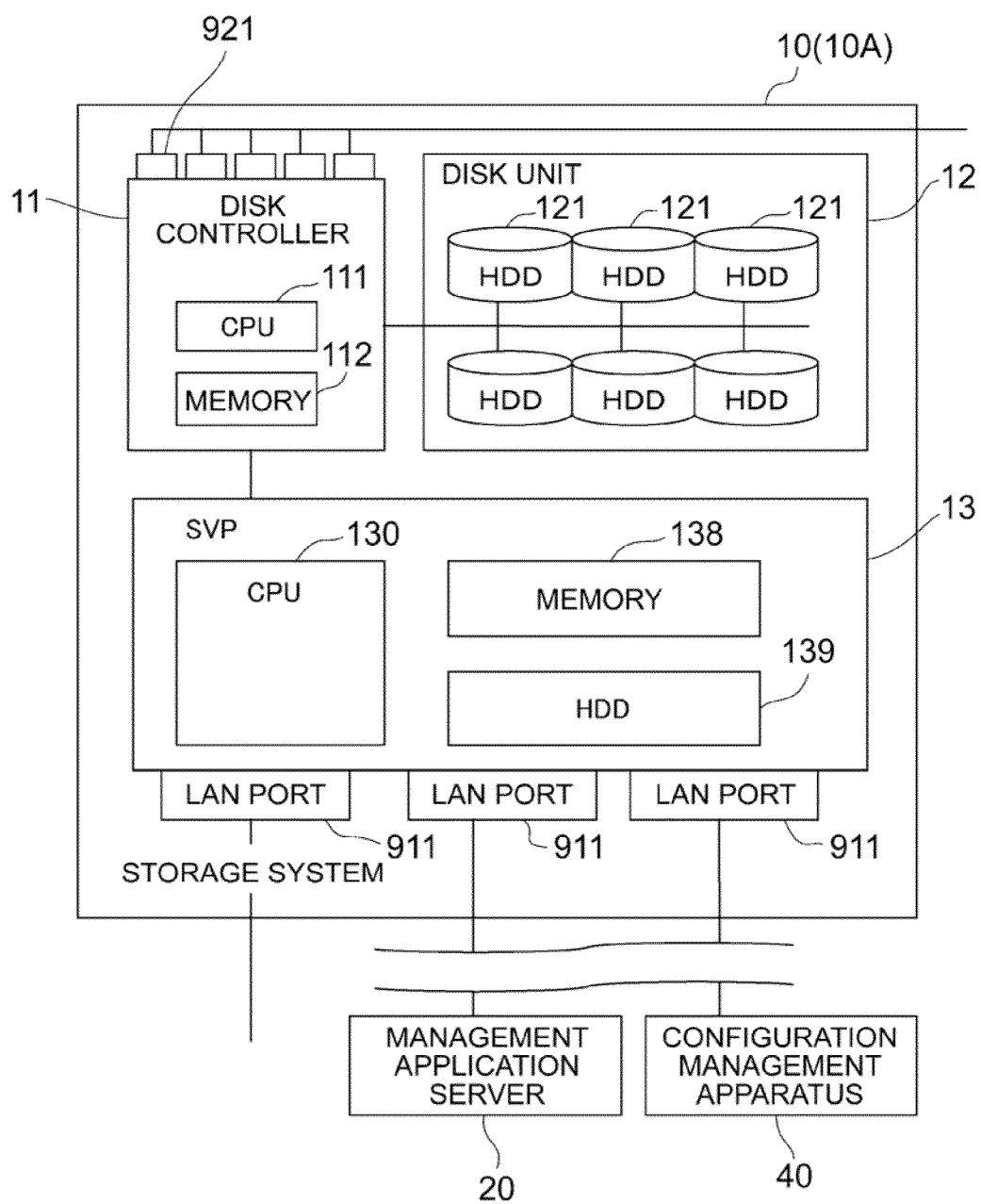
FIG. 2 is a block diagram showing a hardware configuration example of a storage system.

FIG. 2 is a block diagram showing a hardware configuration example of the storage system. As shown in FIG. 2, the disk controller 11 includes a CPU (Central Processing Unit) 111 and a memory 112; and the disk unit 12 includes a plurality of hard disk drives (HDD) 121. Incidentally, the HDDs 121 are an example of the disk drives in the storage system 10. With the disk controller 11, data is stored in the HDDs 121 of the disk unit 12 in accordance with data input/output control by the CPU 111.

Moreover, the SVP 13 includes a CPU 130, a memory 138, and HDDs 139 as shown in FIG. 2. The SVP 13 can be implemented by, for example, connecting a dedicated control board, which is equipped with the CPU 130 and the memory 138, to the HDDs 139. Incidentally, the CPU 130 and the memory 138 may have the configuration that can be substituted by the CPU 111 and the memory 112 of the disk controller; and the HDDs 139 may have the configuration that can be substituted by some of the HDDs 121 in the disk unit 12.

The CPU 130 of the SVP 13 operates in accordance with programs, which are stored in the memory 138 or the HDDs 139 and executed, and manages the configuration information and the failure information of the storage system 10. For example, if the configuration of the storage system 10 is set (or changed), the CPU 130 stores the storage configuration information 131, which indicates the configuration after the setting, in the HDDs 139. Incidentally, specifically speaking, the setting (or change) of the configuration of the storage system 10 is, for example, creation or allocation of a volume in a specified disk drive or initialization of a volume; and the setting operation is generally performed on a volume basis. Moreover, if the occurrence of a failure is detected in the storage system 10, the CPU 130 stores the failure information 132, which indicates the detected failure, in the HDDs 139.

Specifically speaking, the event notifying client 133, the configuration information setting reference API 134, and the communication module 135, which are shown in FIG. 1, are implemented by executing the programs stored in the memory 138 or the HDDs 139; and the storage configuration information 131 and the failure information 132 are stored in the HDDs 139.

Moreover, the SVP 13 is connected to, for example, the disk controller 11, the management application server 20, the event information aggregation server 30, and the configuration management apparatus 40 via the LAN 91 and has a function communicating with external programs. For example, since the CPU 130 of the SVP 13 operates in accordance with storage management software delivered from the management application server 20 which is the opposite party of the communication, it refers to the storage configuration information 131 by using the configuration information setting reference API 134 and sends the obtained storage configuration information 131 to the management application server 20.

Incidentally, if the SVP 13 like the SVP 13C does not have the event notifying client 133 or the configuration information setting reference API 134 and is not connected to the LAN 91, the SVP 13 is connected to the management application server 20 and the event information aggregation server 30 via the configuration management apparatus 40, which is connected in a manner capable of communication, and has a function communicating with the external programs.

Figure 3:
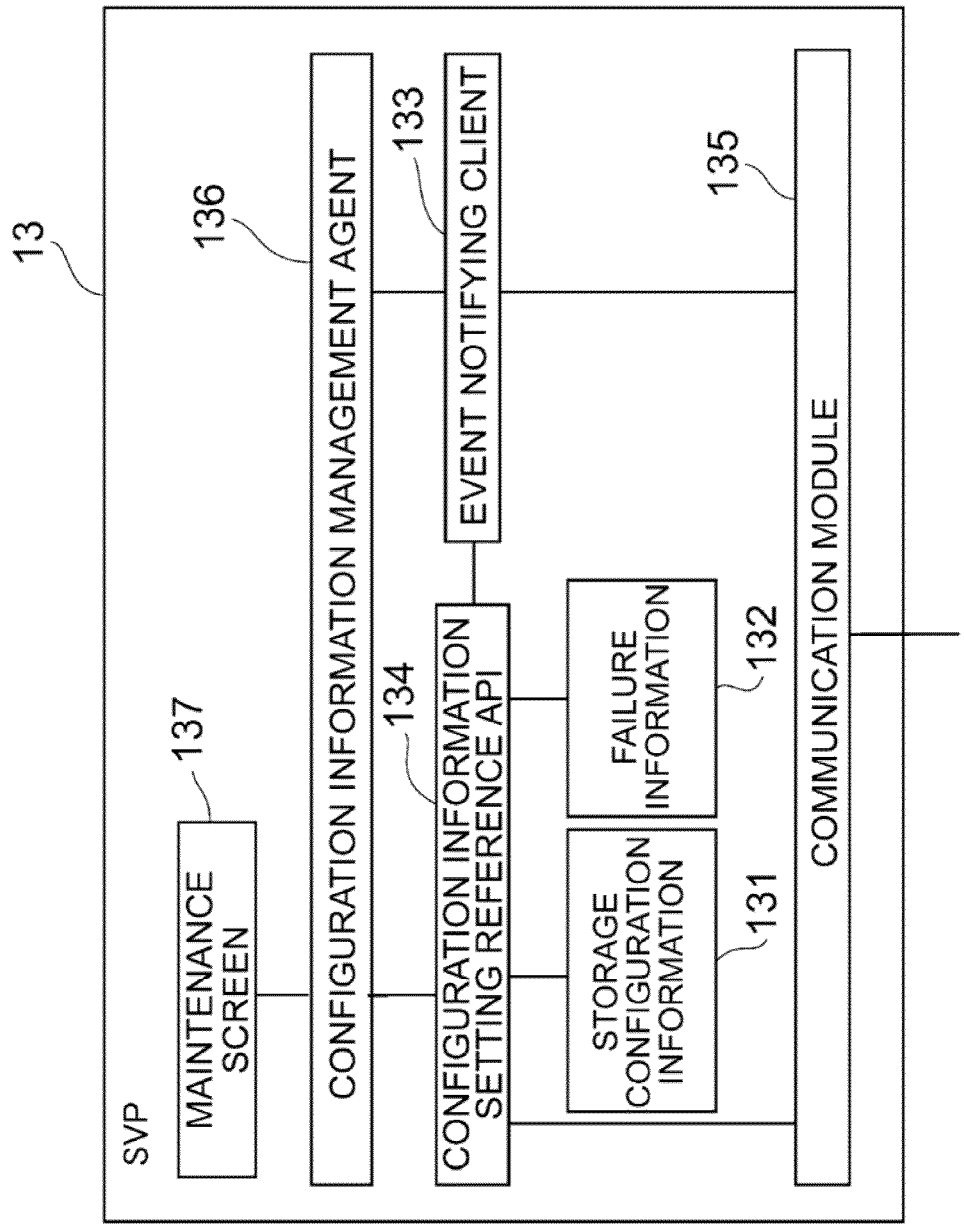
FIG. 3 is a conceptual diagram showing a functional configuration example of an SVP in the storage system shown in FIG. 1.

FIG. 3 is a conceptual diagram showing a functional configuration example of the SVP in the storage system shown in FIG. 1. The storage configuration information 131 is information composed of configuration information of physical volumes and their related information, and configuration information of logical volumes and their related information and is stored in the HDDs 139 shown in FIG. 2. As an example, the storage configuration information 131 is indicated as including port information indicating a port number, host group information indicating a host group of the relevant volume, logical unit (LU) information indicating a logical unit number (LUN), logical volume (LDEV) information indicating a logical volume name, parity group (PG) information indicating a parity group name of a RAID configuration to which the relevant volume belongs, pool information indicating a pool volume name to which the relevant volume belongs, and remote copy information indicating the remote copy relationship between the volumes (for example, see the storage configuration information 131 in FIG. 12 described later).

The failure information 132 is information indicating the content of a failure which has occurred in the storage system 10 and is stored in the HDDs 139 shown in FIG. 2. As an example, the failure information 132 corresponds to, for example, a failure log, which is output at the time of the occurrence of a failure, or a system warning which is output at the time of the occurrence of a failure.

The configuration information setting reference API (Application Program Interface) 134 is a set of commands and functions for referring to the storage configuration information 131 and the failure information 132 and is implemented by the programs stored in the memory 138 or the HDDs 139 in FIG. 2. Incidentally, the configuration information setting reference API 134 also includes commands and functions for setting the storage configuration information 131.

The event notifying client 133 is implemented by the CPU 130 which operates in accordance with programs; and when an event occurs in a volume in the storage system 10, the event notifying client 133 detects the relevant event and registers information about the occurred event (event registration) in cooperation with the event information aggregation server 30. Moreover, the event notifying client 133 communicates with the event information aggregation server 30 via the communication module 135 and regularly checks if any event is retained by the event information aggregation server 30 or not. The communication module 135 is a program for communications between the programs in the SVP 13 and the external programs. Incidentally, specific event registration processing executed between the event notifying client 133 and the event information aggregation server 30 will be explained later with reference to FIG. 14.

The configuration information management agent 136 is an agent program for collecting the storage configuration information 131 and the failure information 132; and necessary programs to implement the configuration information management agent 136 are stored in the memory 138 or the HDDs 139. For example, if the storage configuration is changed, the configuration information management agent 136 issues an instruction to the configuration information setting reference API 134 to collect the configuration information which has been newly set. Moreover, the configuration information management agent 136 may refer to the storage configuration information 131 and the failure information 132 in response to a request from the administrator and display the information as a maintenance screen 137 on a display (not shown). Furthermore, the configuration information management agent 136 may be incorporated and implemented in the event notifying client 133.

Incidentally, if the SVP 13 is configured like the SVP 13C in FIG. 1 so that the SVP 13 does not include the event notifying client 133 or the configuration information setting reference API 134, the SVP 13 (for example, the SVP 13C) cannot spontaneously register events in the event information aggregation server 30. Under this circumstance, an event notifying client 41 of the configuration management apparatus 40 sets or refers to the storage configuration information 131C and the failure information 132C of the storage system 10C by using the configuration information setting reference API 42; and registers the events, which have occurred in the storage system 10C instead of the event notifying client 133.

Figure 4:
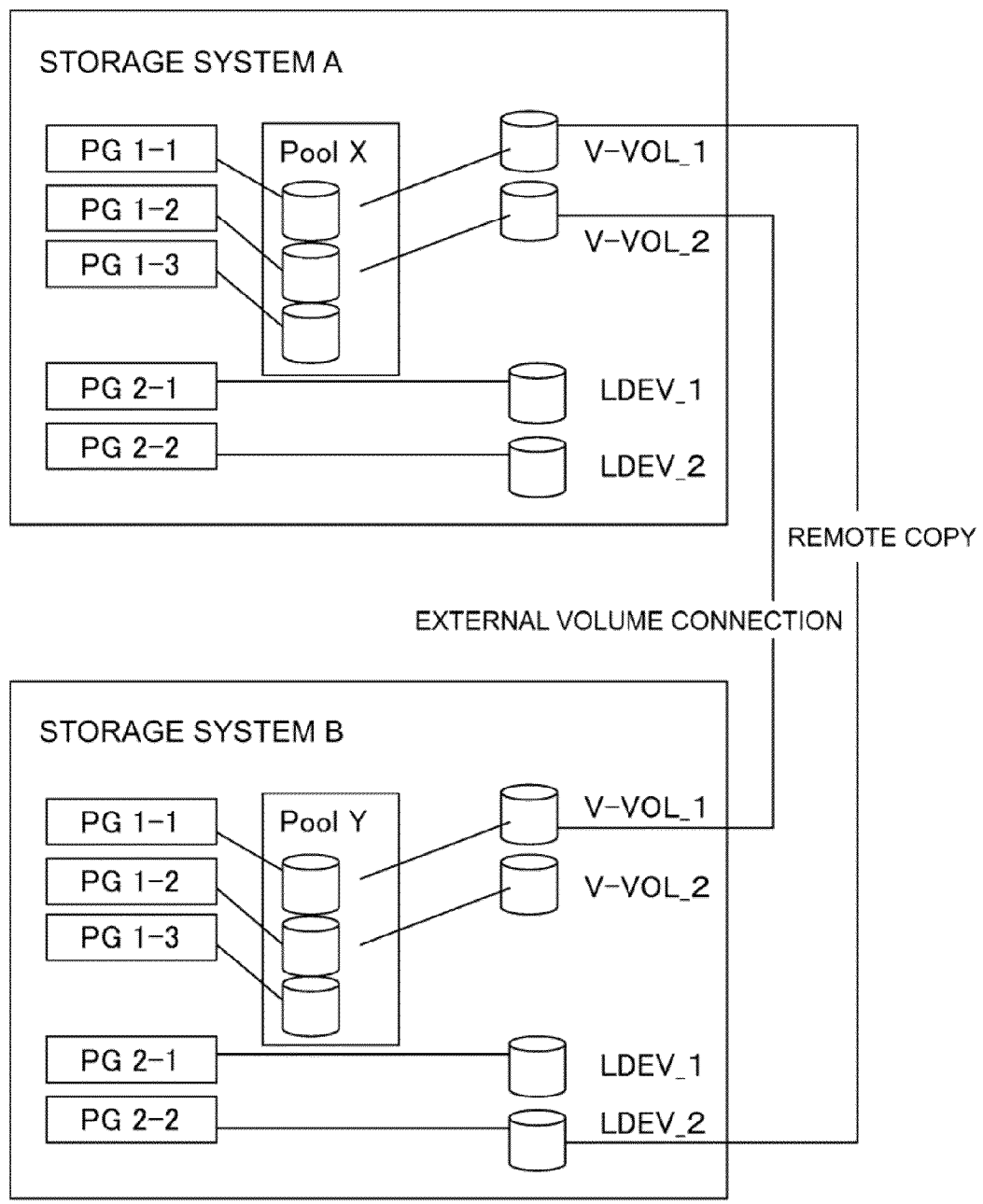
FIG. 4 is a correlation diagram showing an example of the relationship between storage systems.

FIG. 4 is a correlation diagram showing an example of the relationship between the storage systems. As an example, FIG. 4 shows the relationship between the respective volumes in the storage system 10A and the storage system 10B. With the storage system 10A in FIG. 4, volumes to which parity groups (PG: Parity Groups) 1-1, 1-2, and 1-3 are allocated constitute a pool volume (Pool) X. A PG is a group of HDDs for implementing the RAID. Then, Pool X is associated with V-VOL__1 and V-VOL__2 which indicate virtual volumes (V-VOL: Virtual-Volume). Moreover, PG 2-1 and PG 2-2 are allocated to LDEV__1 and LDEV__2 which indicate logical devices (LDEV: Logical Device), respectively.

With the storage system 10B, volumes to which PG 1-1, PG 1-2, and PG 1-3 are allocated constitute a pool volume (Pool) Y and Pool Y is associated with V-VOL__1 and V-VOL__2 which indicate virtual volumes. Moreover, PG 2-1 and PG 2-2 are allocated to LDEV__1 and LDEV__2 which indicate logical devices, respectively.

Then, for example, V-VOL__1 of the storage system 10A and LDEV__2 of the storage system 10B are connected by a remote copy method and data is copied from the storage system 10A side to the storage system 10B side. Moreover, V-VOL__2 of the storage system 10A and V-VOL__1 of the storage system 10B are connected by an external volume connection method and data is migrated from the storage system 10A side to the storage system 10B side.

(1-1-2) Management Application Server

The management application server 20 is a web application server that delivers storage management software for referring to and setting the storage configuration information. When the administrator makes a request to browse an event, the management application server 20 has a web browser 51 of the administrator terminal 50 display an event browse screen 52, which shows the relativity of a region, where the relevant event has occurred, to a region, where its related event has occurred, based on the event information 31 of the relevant event. Furthermore, the management application server 20 has a function providing the administrator terminal 50 with the setting/failure information associated with the event key in response to a request from the administrator.

The management application server 20 includes the setting/failure information 21 as shown in FIG. 1. The setting/failure information 21 is information obtained by referring to the storage configuration information 131 and the failure information 132 of the storage system 10 and is divided into screen information 22, audit log information 23, and failure information 24. Specifically speaking, the screen information 22 corresponds to, for example, snapshots indicating the storage configuration at the time of setting or reference or snapshots indicating the status at the time of the occurrence of a failure. Moreover, the audit log information 23 corresponds to an audit log recorded at the time of setting of the storage information and information relating to that audit log. Moreover, the failure information 24 corresponds to information indicating the failure content recorded at the time of the occurrence of a failure.

Each of the screen information 22, the audit log information 23, and the failure information 24 is assigned an ID (a screen ID, an audit log ID, and a failure ID) when it is obtained by the management application server 20. The management application server 20 also manages the correspondence relationship between the IDs and the information.

Figure 5:
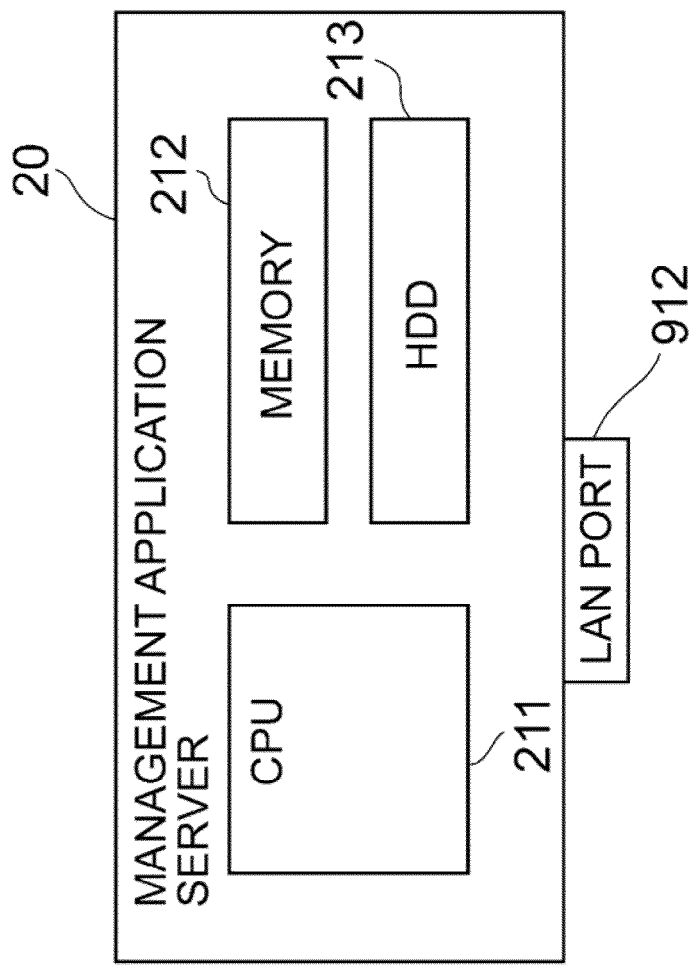
FIG. 5 is a block diagram showing a hardware configuration of a management application server.

FIG. 5 is a block diagram showing a hardware configuration of the management application server. As shown in FIG. 5, the management application server 20 can use a general server equipped with a CPU 211, a memory 212, and HDDs 213. The CPU 211 executes the storage management software which is stored as programs in the memory 212 or the HDDs 213, thereby delivering the storage management software via the LAN 91. Moreover, the setting/failure information 21 is stored in the HDDs 213.

Figure 6:
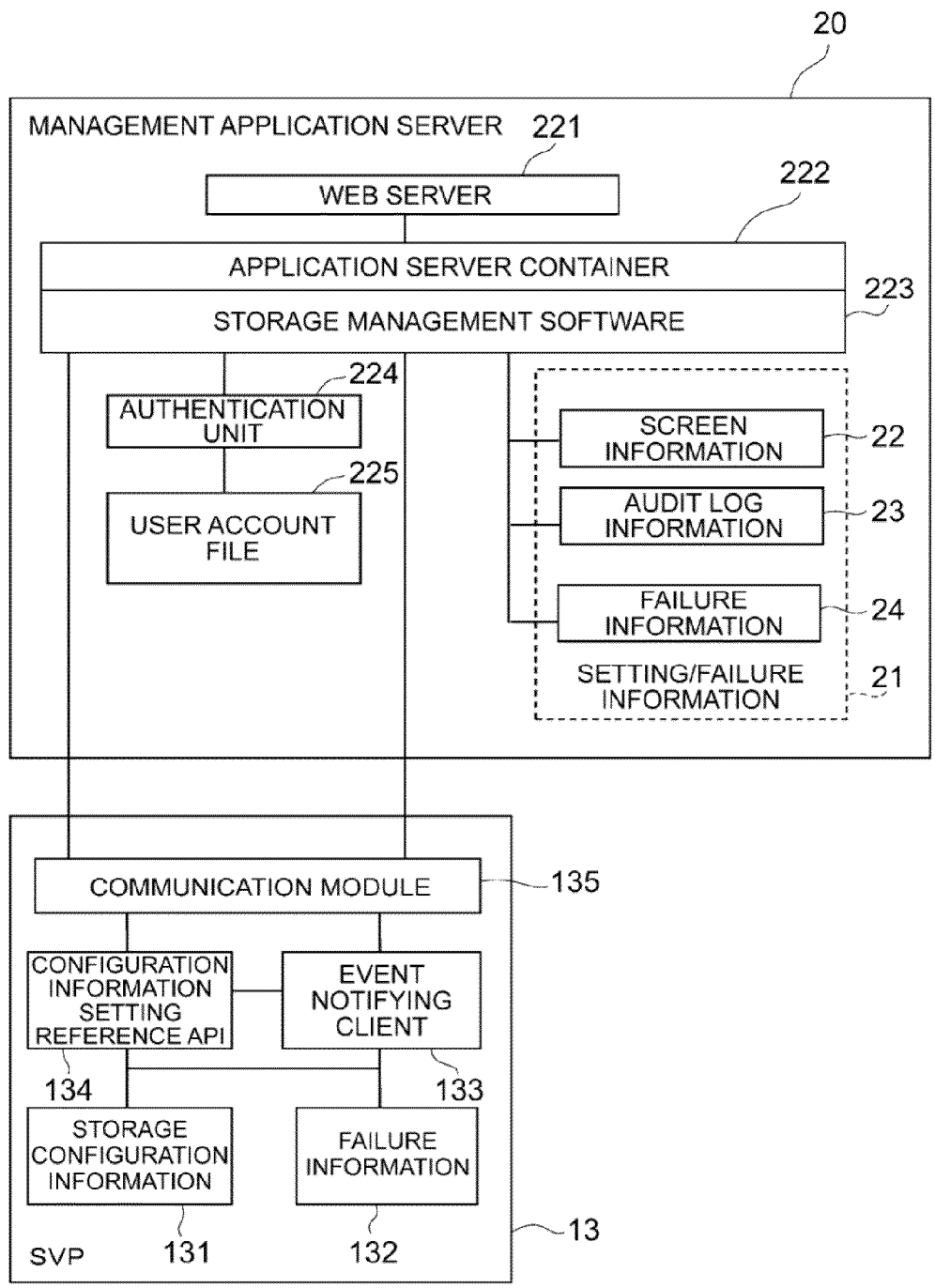
FIG. 6 is a conceptual diagram showing a functional configuration of the management application server.

FIG. 6 is a conceptual diagram showing a functional configuration of the management application server. With the management application server 20 shown in FIG. 6, for example, storage management software 223 and the setting/failure information 21 are incorporated and stored in an application server container 222. Furthermore, the application server container 222 is provided with an authentication unit 224 for authenticating users of the storage management software 223 and account information of the users is stored in a user account file 225. The user account file 225 is stored in the HDDs 213 in FIG. 5.

The storage management software 223 is executed by the management application server 20 and is provided via the web server 221 to the web browser 51 of the administrator terminal 50. Moreover, the storage management software 223 can communicate with the event notifying client 133 and the configuration information setting reference API 134 of the SVP 13 in the storage system 10 via the LAN 91.

(1-1-3) Event Information Aggregation Server

If an event occurs in a volume in the storage system 10, the even information aggregation server 30 is a web application server that aggregates and stores the event information 31 indicating the outline of the relevant event including key information (event key) for the relevant event. As shown in FIG. 1, the event information 31 includes an event dictionary 32, event region information 33, and related region information 34. Then, the event information aggregation server 30 has a function notifying the administrator terminal 50 of an event occurrence notice including the event key.

Figure 7:
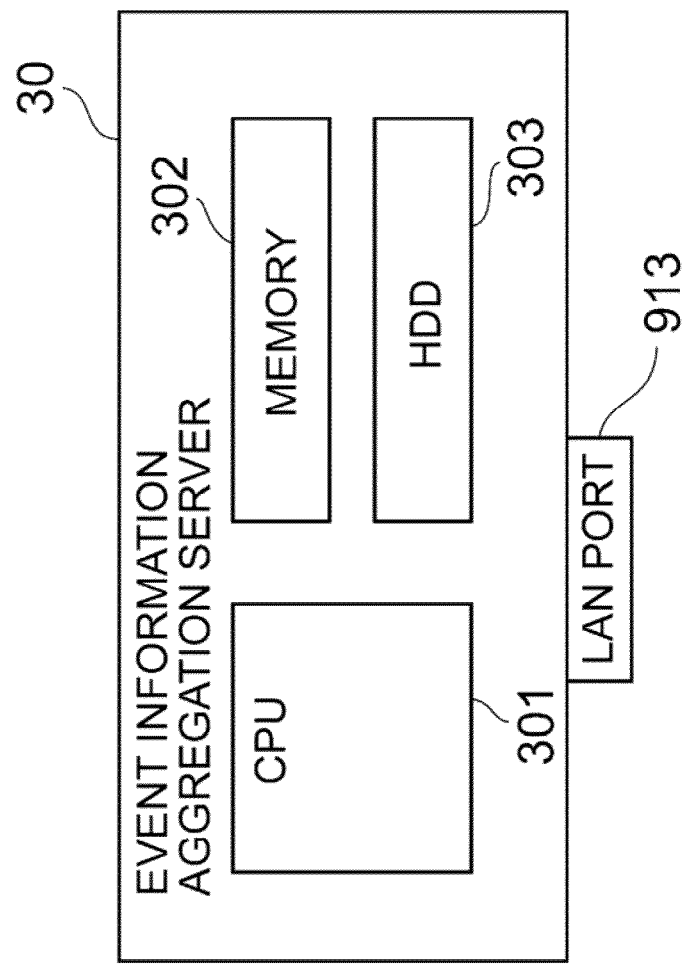
FIG. 7 is a block diagram showing a hardware configuration of an event information aggregation server.

FIG. 7 is a block diagram showing a hardware configuration of the event information aggregation server. The event information aggregation server 30 is equipped with a CPU 301 for controlling each component, a memory 302 storing programs, and HDDs 303 storing the event information 31. The event information aggregation server 30 implements management control by an event information management manager 323 described later with reference to FIG. 8 by means of the execution of the programs stored in the HDDs 303 by the CPU 301.

Figure 8:
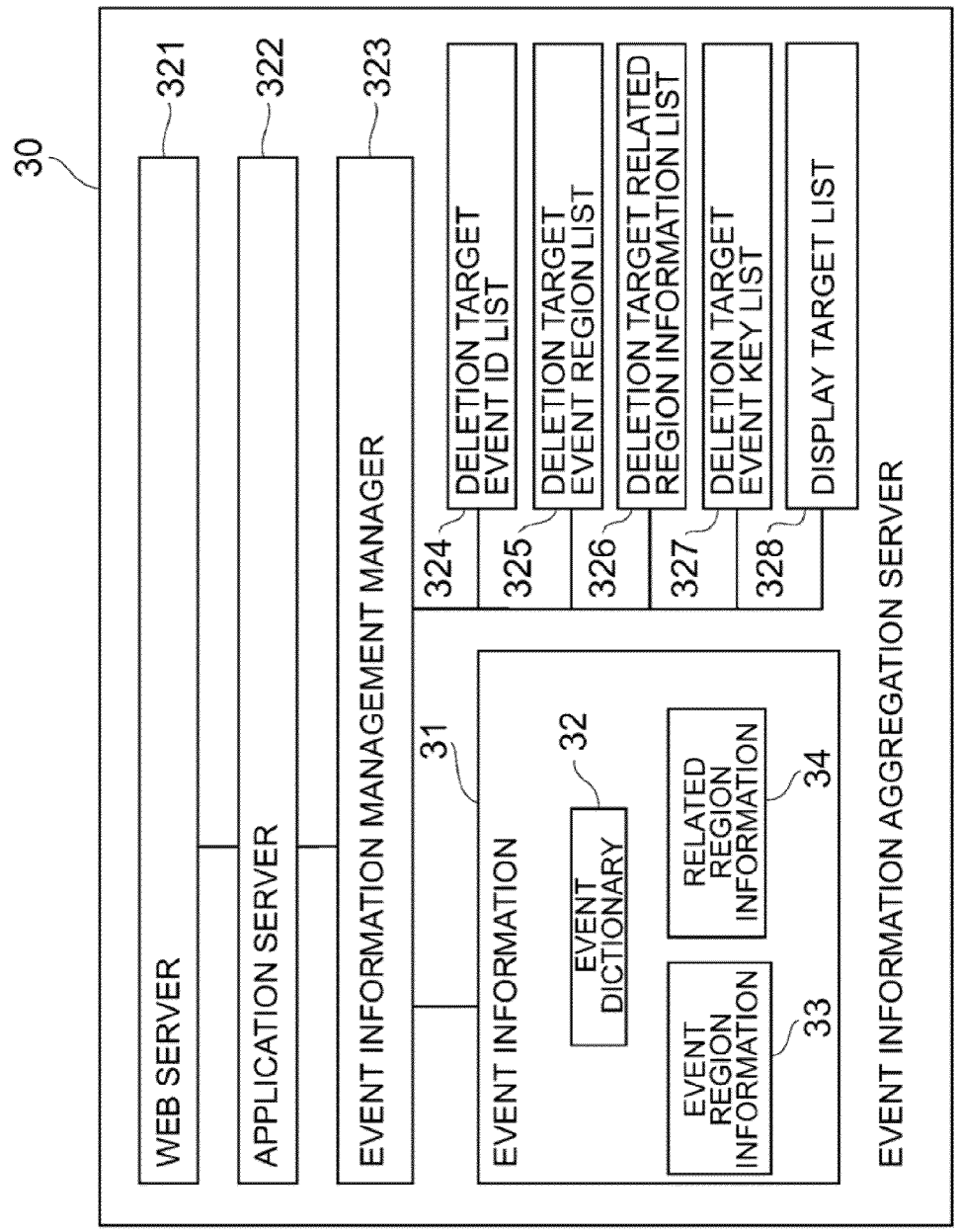
FIG. 8 is a schematic diagram showing a software configuration of the event information aggregation server.

FIG. 8 is a schematic diagram showing a software configuration of the event information aggregation server. The event information management manager 323 operates by executing the programs stored in the memory 302 or the HDDs 303 and communicates with the storage system 10, the management application server 20, and the administrator terminal 50 via the application server 322 and the web server 321.

The event information management manager 323 creates and manages the event information 31 based on the information about an occurred event registered by the event notifying client 133, 41. Specifically speaking, for example, the event information management manager 323 executes processing for, for example, getting an ID of the relevant event to be registered in the event dictionary 32, deciding a unique event key, creating the event region information 33 about a volume in which the relevant event has occurred, and gathering information, which is generated in a volume (related region) related to the relevant event as an inducing source, as the related region information 34. Moreover, after creating the event information 31 corresponding to the occurred event, the event information management manager 323 sends the event key to the administrator terminal by e-mail or other message transmission methods, thereby notifying the administrator terminal that the relevant event has occurred (event occurrence notice). Incidentally, the details of the event information 31 created by the event information management manager 323 will be explained later with reference to FIG. 12.

Moreover, the event information management manager 323 also manages lists related to deletion and display of the event information such as a deletion target event ID list 324, a deletion target event region list 325, a deletion target related region information list 326, a deletion target event key list 327, and a display target list 328. The details of the lists related to deletion and display of the event information will be explained later with reference to flowcharts shown in FIGS. 18 to 20.

Incidentally, the event information 31, the deletion target event ID list 324, the deletion target event region list 325, the deletion target related region information list 326, the deletion target event key list 327, and the display target list 328 are stored in the memory 302 or the HDDs 303 shown in FIG. 7.

(1-1-4) Configuration Management Apparatus

The configuration management apparatus 40 is an apparatus for referring to or collecting the storage configuration information 131 instead of the SVP 13 of the storage system 10 and includes the event notifying client 41, the configuration information setting reference API 42, and the storage configuration information 43. The configuration management apparatus 40 has functions similar to those of, for example, the event notifying client 133A, the configuration information setting reference API 134A, and the storage configuration information 131A of the SVP 13A. Incidentally, the event notifying client 41 of the configuration management apparatus 40 may function not only as an event notifying client in the SVP 13C in FIG. 1, but also as an event notifying client in the SVPs 13A to 13C of all the storage systems 10A to 10C which are connected via the LAN 91; however, the case where the event notifying client 41 functions as the event notifying client in the SVP 13C in FIG. 1 will be explained below.

Figure 9:
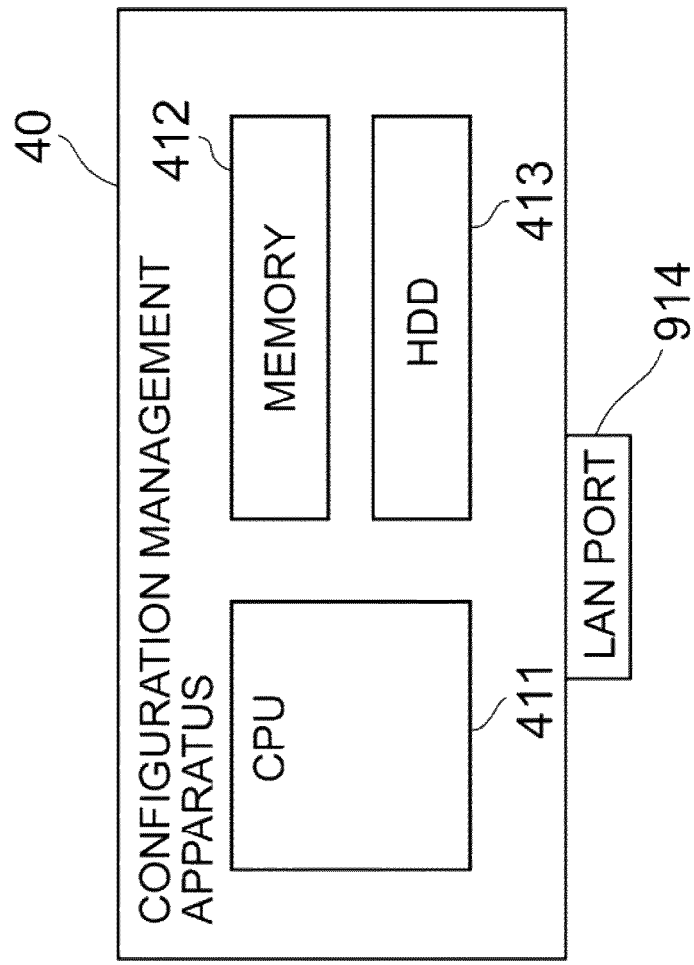
FIG. 9 is a block diagram showing a hardware configuration of a configuration management apparatus.

FIG. 9 is a block diagram showing a hardware configuration of the configuration management apparatus. As shown in FIG. 9, the configuration management apparatus 40 includes a CPU 411, a memory 412, and HDDs 413. The event notifying client 41 and the configuration information setting reference API 42 shown in FIG. 1 are implemented by executing programs stored in the memory 412 or the HDDs 413. Moreover, the storage configuration information 43 shown in FIG. 1 is stored in the HDDs 413.

For example, if the storage configuration of the storage system 10C shown in FIG. 1 is set or changed, the event notifying client 41 refers to the storage configuration information 131C of the SVP 13C by using the configuration information setting reference API 42 and stores it as the storage configuration information 43.

Moreover, the event notifying client 41 communicates with the storage system 10 (10A to 10C), the management application server 20, the event information aggregation server 30, and the administrator terminal 50 via the LAN 91 connected to the LAN port 914.

(1-1-5) Administrator Terminal

The administrator terminal 50 is used by the administrator to perform, for example, browsing and operations. Specifically speaking, the administrator terminal 50 is a terminal to be used for inputs by the administrator or outputs to the administrator such as reception of an event notice to the administrator and display of information about an event selected by the administrator. The administrator terminal 50 is connected to the management application server 20 and the event information aggregation server 30 via the LAN 91, thereby displaying the event browse screen 52 for displaying information about an event, for which the administrator has made a browse request, and the storage configuration setting screen 53 for setting the storage configuration of the storage system 10 on the web browser 51.

Figure 10:
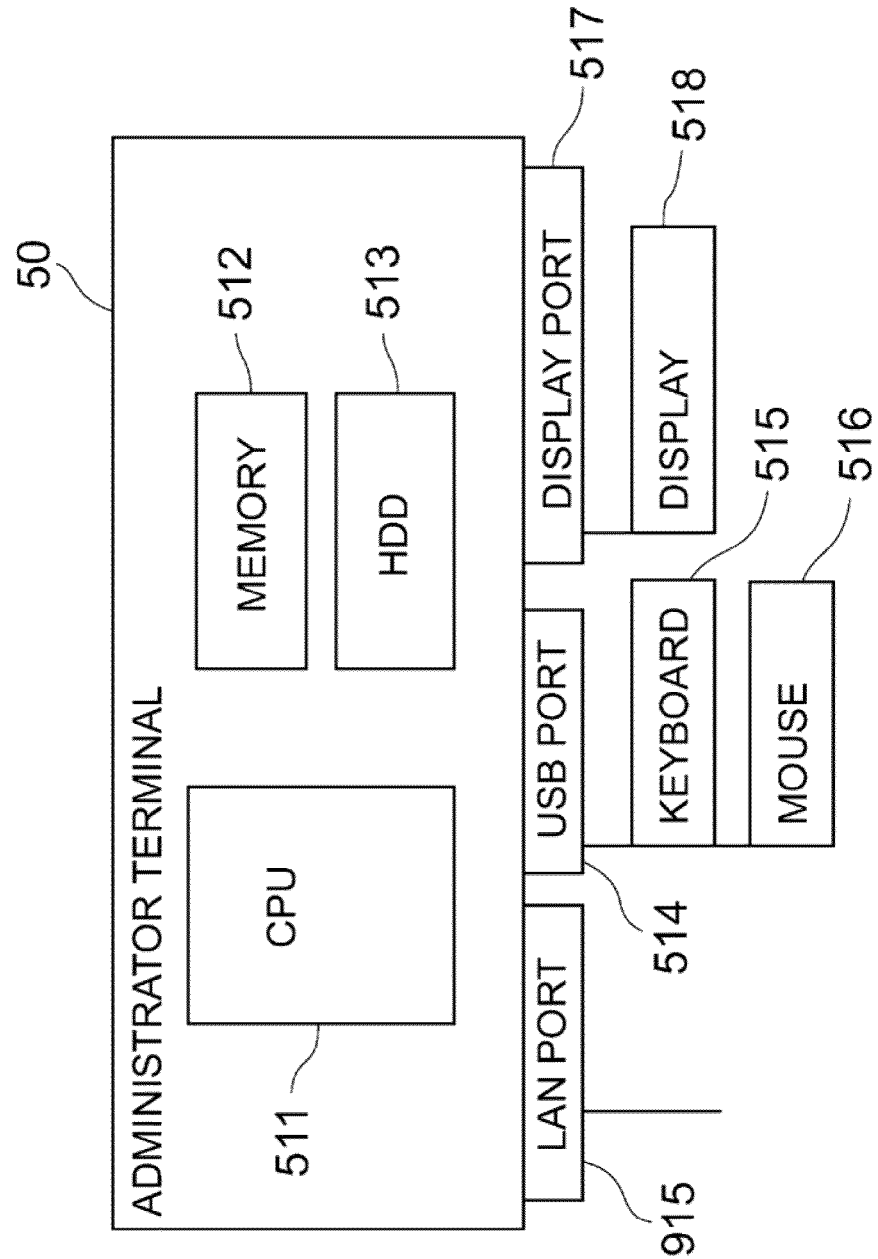
FIG. 10 is a block diagram showing an example of a hardware configuration of an administrator terminal.

FIG. 10 is a block diagram showing an example of a hardware configuration of the administrator terminal. As shown in FIG. 10, the administrator terminal 50 includes, for example, a CPU 511, a memory 512, HDDs 513, a LAN port 915, a USB port 514 for connecting a keyboard 515 and a mouse 516, and a display port 517 for connecting a display 518; and can be implemented by using a general personal computer (PC). The keyboard 515 and the mouse 516 are examples of input devices used by the administrator to perform input operations on the administrator terminal 50 and the display 518 is an example of an output device to display outputs. The web browser 51 shown in FIG. 1 is displayed on the display 518.

Figure 11:
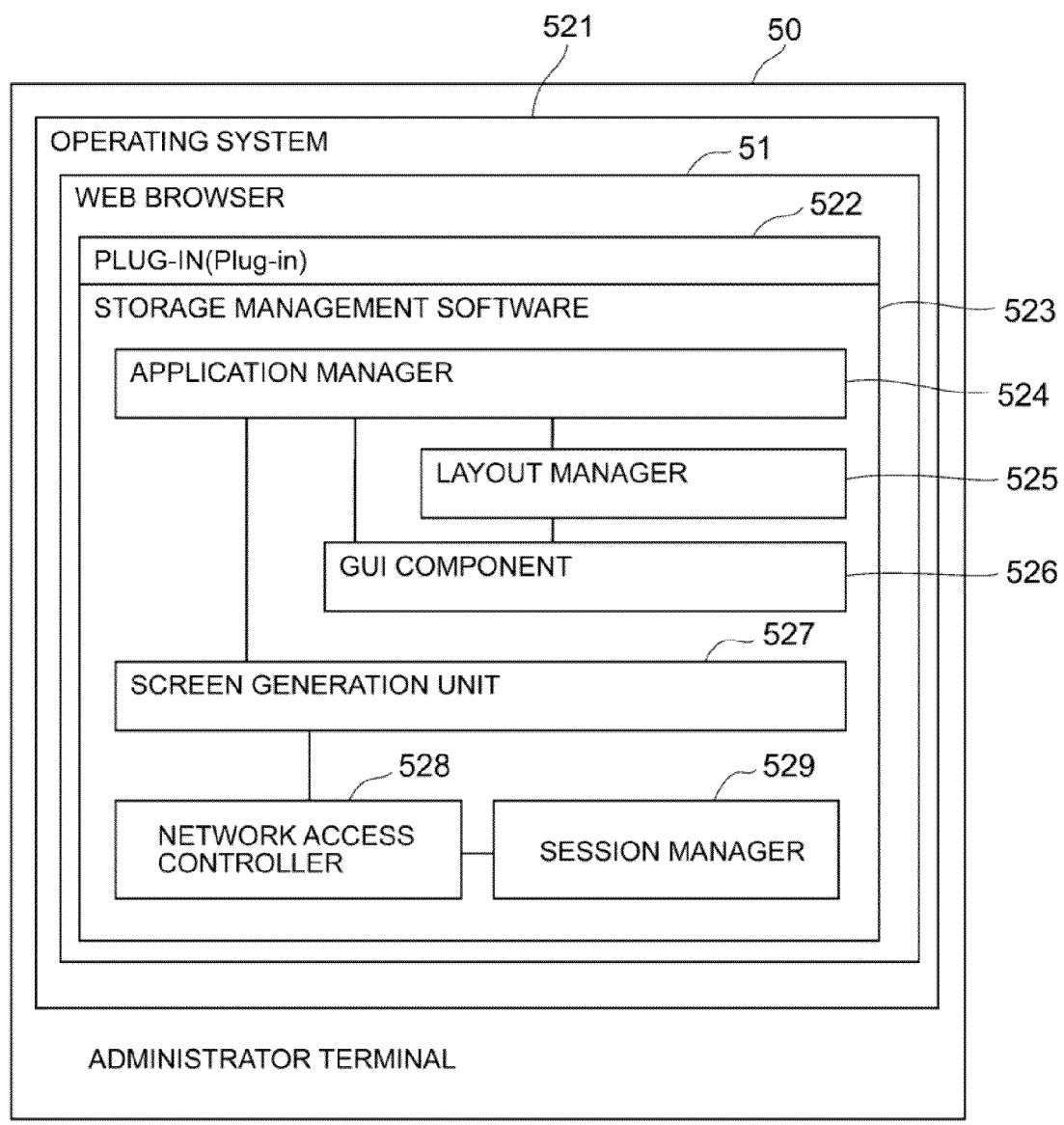
FIG. 11 is a block diagram showing an example of a software configuration of the administrator terminal.

FIG. 11 is a block diagram showing an example of a software configuration of the administrator terminal. With the administrator terminal 50, an operating system 521 which is a program stored in the HDDs 513 is executed by the CPU 511. The operating system 521 provides the web browser 51. The storage management software 223 (corresponding to storage management software 523 in FIG. 11) provided by the management application server 20 via the web server 221 is displayed on the web browser 51. The storage management software 523 is executed by adding a program (plug-in) 522 for functional extension on the web browser 51. The storage management software 523 has functional elements such as a layout manager 525 for managing a display configuration, a GUI (Graphical User Interface) component 526 for displaying screens on the display 518, a screen generation unit 527 for generating screens in a frame configured by the GUI component 526, a network access controller 528 for managing communications with the network, a session manager 529 for managing operation units by the user (administrator) as sessions, and an application manager 524 for controlling each component.

With the administrator terminal 50 configured as described above, the administrator can perform input operations on the storage management software 523 displayed on the web browser 51. For example, as the administrator performs the operation to select a specified event, a screen indicating the relativity of a volume, in which the event has occurred, to a volume in which its related event has occurred (event browse screen 52) is output to the web browser 51 based on the event information of the relevant event. Moreover, as the administrator performs a specified operation when the storage configuration setting screen 53 is displayed, the storage configuration is set or changed with respect to the storage system 10 connected via the LAN 91.

(1-2) Event Information

The details of the event information will be explained below. As explained earlier, the event information is information for explaining the outline of an event, which has occurred in a volume in the storage system 10, and is created and managed by the event information aggregation server 30. If an event occurs in a volume in the storage system 10, the event information is created as triggered by an event registration request from the event notifying client 133, 41 to the event information aggregation server 30.

Figure 12:
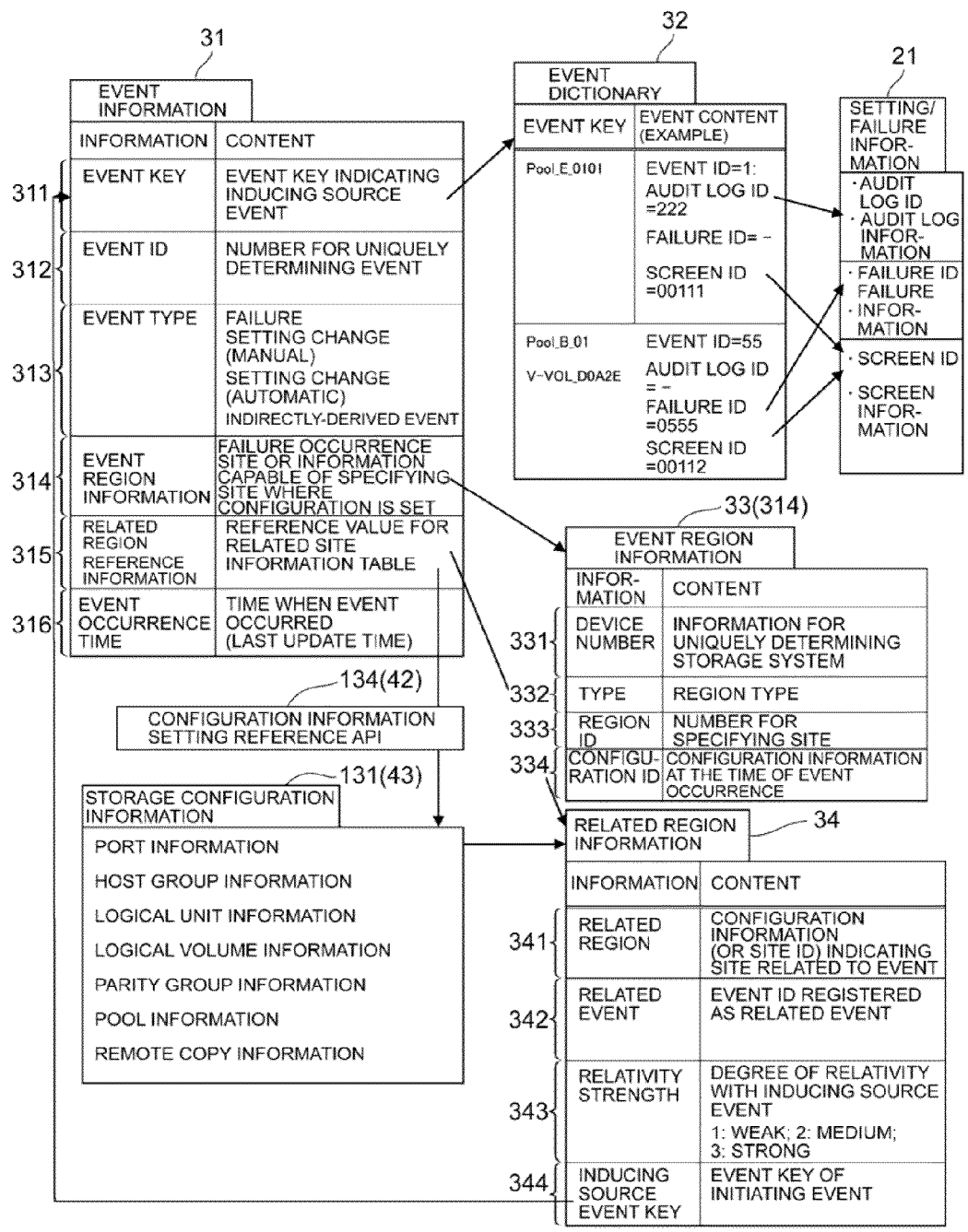
FIG. 12 is a conceptual diagram showing a data structure example of event information.

FIG. 12 is a conceptual diagram showing a data structure example of the event information. As shown in FIG. 12, the event information 31 is configured by including an event key 311, an event ID 312, an event type 313, event region information 314, related region reference information 315, and an event occurrence time 316.

The event key 311 with respect to the occurred event stores key information capable of uniquely specifying a combination of an event which is an inducing source (inducing source event), and the setting/failure information 21 related to the relevant event. The event key 311 is decided by the event information management manager 323 and the event content corresponding to the event key 311 is registered in the event dictionary 32. The setting/failure information 21 is stored in the management application server 20.

For example, referring to the event dictionary 32 in FIG. 12, the event content with the event ID $1,$ the audit log ID $222,$ and the screen ID $00111$ is registered corresponding to the event key $Pool_E_0101.$ Since the audit log ID is described and the failure ID has no value, it is found that the event with this event key as its inducing source is not the occurrence of a failure, but the setting (or change) of the storage configuration information. Furthermore, it is found that the setting/failure information 21 stores the audit log information corresponding to the audit log ID $222$ and the screen information corresponding to the screen ID $00111.$ The event information 31 is designed so that reference can be easily made to the setting/failure information 21 related to an event key 611, which is stored in the management application server 20, by registering association between the event key 611 and various IDs in an event dictionary 62.

The event ID 312 stores an ID assigned to an event so that the event can be uniquely identified. For example, the correspondence relationship between the event ID and the event content is registered in the event dictionary 32. Incidentally, association between the ID assigned to the relevant information with not only information corresponding to the event key 311 and the event ID, but also with other information of the event information 31 described later is registered in the event dictionary 32.

The event type 313 stores the event type or a value corresponding to the type. Specific examples of the event type are: $Failure$ indicating the occurrence of a failure; $Setting Change (Manual)$ indicating a manual change of the setting of the storage configuration; $Setting Change (Automatic)$ indicating an automatic change of the setting of the storage configuration by means of, for example, execution of software; and $Indirectly-derived Event$ indicating that the event occurred as derived from the occurrence of an inducing source event. For example, if a remote copy error occurs in a volume B, which is a remote copy destination, as derived from the occurrence of an input/output error in a volume A in a remote copy source, the input/output error in the volume A corresponds to an inducing source event which is $Failure$ and the failure of the remote copy error in the volume B corresponds to $Indirectly-derived Event.$ The event region information 314 stores information for specifying a region where the relevant event has occurred. If the occurred event is the occurrence of a failure, information for specifying in which region the failure has occurred is stored; and if the event is the setting of the storage configuration, information for specifying in which region (volume) the storage configuration is set is stored. More specifically, as shown in the event region information 33 in FIG. 12, the event region information 314 includes: a device number 331 for uniquely specifying the storage system 10 where the relevant event has occurred, a region type 332, a region ID 333 for uniquely specifying the region, and a configuration ID 334 for uniquely specifying configuration information at the time of the occurrence of the event. For example, a product number of the storage system 10 can be used as the device number 331 and a predetermined ID according to, for example, the RAID configuration or the number of volumes in the storage system 10 can be used as the configuration ID 334.

The related region reference information 315 stores a reference value for the related region information 34 indicating information about the related region affected by the relevant event. The related region information 34 is created based on the storage configuration information 131 (or the storage configuration information 43) as shown in an example in FIG. 12.

The storage configuration information 131 is obtained by using the configuration information setting reference API 134 (or the configuration information setting reference API 42) to refer to the storage system 10 in which the event has occurred. Incidentally, items of the storage configuration information shown in FIG. 12 are examples and it is not necessary to include all of them and other items may be further included. Moreover, if the configuration of another storage system 10 is associated with the obtained storage configuration information 131, the storage configuration information 131 is further obtained for that other storage system 10 and the related region information 34 is further created based on these pieces of configuration information.

The related region information 34 is stored as, for example, data of a table format and is constituted from a related region field 341, a related event field 342, a relativity strength field 343, and an inducing source event key field 344 as shown in FIG. 12.

The related region field 341 stores the configuration information indicating a region related to the event based on the storage configuration information 131 obtained from the storage system 10. The configuration information stored in the related region field 341 may be a region ID for specifying the region related to the event. For example, if the storage configuration information 131 stores a volume, a pool, or the like which is related to the event region information 314 of the event information 31, such a volume, pool, or the like is stored in the related region field 341.

The related event field 342 stores an event ID for uniquely specifying an event which has occurred in the related region (related event). The relativity strength field 343 stores a degree of relativity of the related event to the inducing source event and stores, for example, any of the numbers $1,$ $2,$ or $3$ in an ascending order from the weakest relativity to the strongest relativity. The inducing source event key field 344 stores an event key indicating the inducing source event and stores the same event key as that of the event key information of the event information.

The event occurrence time 316 stores time when the event occurred. The event occurrence time 316 may store last update time when the information was updated last time in relation to the relevant event.

Then, if related regions are stored in the related region field 341 of the related region information 34, another event information 31 is created for each of the described related regions without changing the value of the inducing source event key. Therefore, for example, if five different related regions exist for one event, six pieces of event information 31 which have the same inducing source event key are created for the region where the inducing source event occurred and the five related regions.

Figure 13:
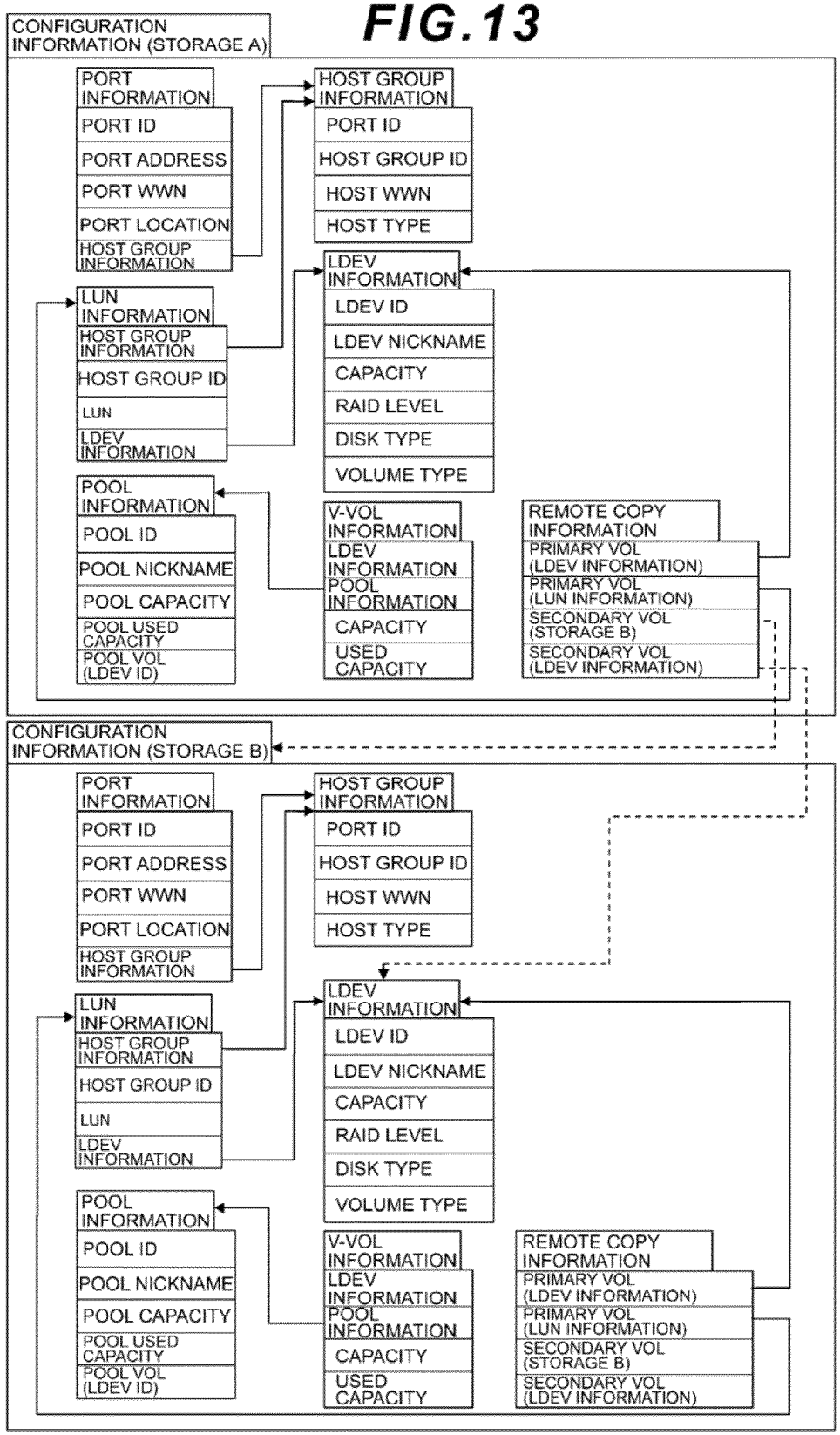
FIG. 13 is a correlation diagram showing an example of the relativity between volumes as represented by storage configuration information.

FIG. 13 is a correlation diagram showing an example of the relativity between volumes, as represented by the storage configuration information. FIG. 13 shows the configuration information of a plurality of volumes constituting storage A and storage B; and if the relativity exists between volumes, the volumes are connected with an arrow in FIG. 13. If an event occurs in storage A or storage B, the event information aggregation server 30 creates not only event information for a volume where the event occurred, but also event information for a volume having the relativity with the event-occurred volume in accordance with the format explained in FIG. 12 (registration of the event information).

(1-3) Processing by Event Notification System

A processing sequence by the event notification system shown in FIG. 1 will be explained below.

Figure 14:
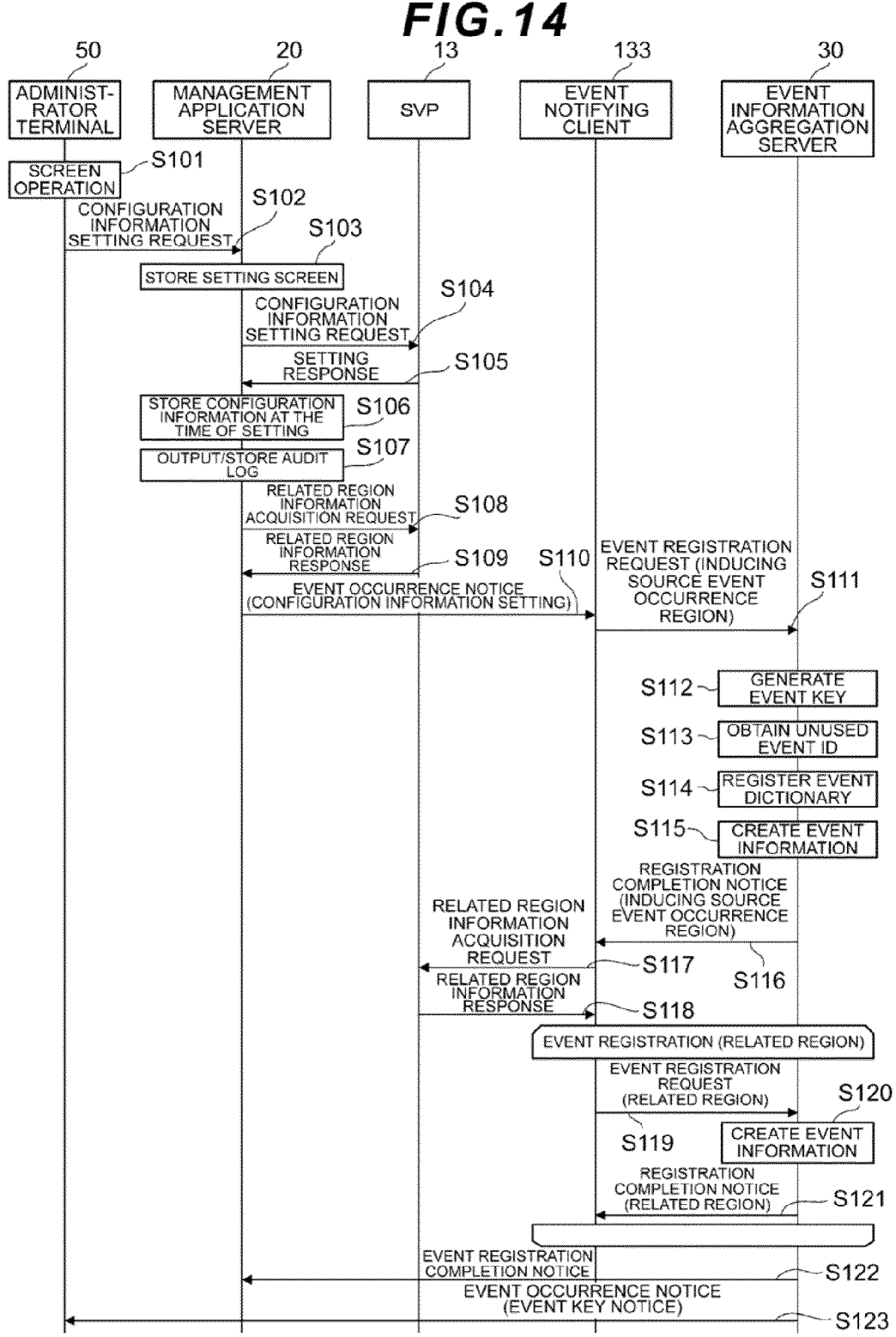
FIG. 14 is a sequence diagram showing a processing sequence executed by the event notification system for sending an event occurrence notice when setting the storage configuration information.

(1-3-1) Event Occurrence Notice at the Time of Setting of Configuration Information Firstly, processing executed by the event notification system 1, when setting the storage configuration information in the storage system 10, for sending an event occurrence notice to the administrator terminal 50 will be explained. FIG. 14 is a sequence diagram showing a processing sequence executed by the event notification system for sending the event occurrence notice when setting the storage configuration information. Incidentally, only the event notifying client 133 in the SVP 13 is described separately and other components are described as the SVP 13 in FIG. 14. Incidentally, instead of the event notifying client 133 shown in FIG. 14, the event notifying client 41 of the configuration management apparatus 40 may be used.

Firstly, it is assumed that the storage management software is supplied from the management application server 20 to the web browser 51 of the administrator terminal 50 and the storage configuration setting screen 53 is displayed. When the administrator operates the screen for setting the storage configuration of the storage system 10 on the web browser 511 (step S101) under this circumstance, the administrator terminal 50 sends a configuration information setting request to the management application server 20, which provides the storage management software, to set the storage configuration information (step S102). After receiving the configuration information setting request, the management application server 20 obtains a snapshot of the setting screen on the storage configuration setting screen 53 and stores it as the screen information 22 (step S103).

Next, the management application server 20 transfers the configuration information setting request to the SVP 13 of the storage system 10 having a volume which is a storage configuration setting target (step S104). Having received the configuration information setting request, the SVP 13 sets the storage configuration in accordance with the request; and when the setting is completed, the SVP 13 returns a setting response (step S105).

After receiving the setting response, the management application server 20 obtains a snapshot of the post-setting storage configuration information, adds it to the screen information 22, and stores it (step S106). The post-setting storage configuration information can be obtained by referring to the storage configuration information 133 of the storage system. Moreover, the management application server 20 outputs an audit log indicating that the setting of the storage configuration has been set; and stores the relevant audit log as the audit log information 23 (step S107).

Next, the management application server 20 sends a related region information acquisition request to the SVP 13 to request information about a region affected by the setting of the storage configuration information, that is, information about a related region of the volume for which the setting has been set (step S108). The SVP 13 obtains information of the related region from the storage configuration information 131 in response to the related region information acquisition request and provides it to the management application server 20 (step S109).

Subsequently, the management application server 20 notifies the event notifying client 133 of the occurrence of the event, which is the setting of the storage configuration information (step S110). Incidentally, if the event notifying client exists inside the storage system 10 as in the storage system 10A, the notice in step S110 is not always necessary; and, for example, when the SVP 13 returns the response to the management application server 20 in step S105, the SVP 13 may notifies the event notifying client 133 that the setting of the storage configuration information has been set. Moreover, if the event notifying client 133 (or the event notifying client 41) regularly refers to the storage configuration information 131 in the SVP 13, the event notifying client 133 can spontaneously detects the setting of the storage configuration information by judging whether the storage configuration information 131 has changed or not.

As a result of the processing in step S110, the event notifying client 133 detects the occurrence of the event and sends an event registration request to the event information aggregation server 30 to request the event registration (step S111). In step S111, the event registration for the region where the inducing source event has occurred (inducing source event occurrence region) is requested. Specifically speaking, for example, the volume regarding which a change of the setting is clearly indicated by means of the operation by the administrator in step S101 corresponds to the inducing source event occurrence region.

With the event information aggregation server 20 which has received the event registration request in step S111, the event key 311 is generated (step S112), an unused event ID 312 is obtained (step S113), the event dictionary 32 is registered (step S114), and the event information 31 is created by using the information obtained in steps S112 to S114 (step S115) as explained with reference to FIG. 12. When the event information 31 is created in step S115, the event region information 33 is created and the related region information 34 is also created. Incidentally, it is stated in the section where FIG. 12 is explained that the storage configuration information 131 is required in order to create the related region information 34; however, the storage configuration information 131 may be sent to the event information aggregation server 30 in advance from the management application server 20 which obtained the related region information in step S109. Moreover, when executing processing in step S115, the event information aggregation server 30 may request for and obtain the storage configuration information 131 of the SVP 13.

Having created the event information 31 in step S115, the event information aggregation server 30 sends a registration completion notice, which indicates the completion of the event registration with respect to the inducing source event occurrence region, to the event notifying client 133 (step S116). When this happens, the event information aggregation server 30 sends at least part of the created event information 31 to the event notifying client 133.

The event notifying client 133 requests the SVP 13 of the storage system 10 having the related region indicated by the relevant region ID to provide information about the related region from the storage configuration information 131 based on the region ID stored in the related region field 341 of the related region information 34 (step S117). The SVP 13 provides the information about the related region to the event notifying client 133 in response to the request (step S118).

Then, if the related region exists in the related region information 34, the event notifying client 133 sends an event registration request to the event information aggregation server 30 to request for the event registration of the related region (step S119). Having received the event registration request, the event information aggregation server 30 creates the event information 31 about the related region, using the same event key 311 as that of the processing in steps S112 to S115 (step S120) and sends a completion notice to the event notifying client 133 (step S121).

The event registration of the related region in steps S119 to S121 is performed as many times as the number of the related region(s) stored in the related region information 34 of the event information 31 created in step S115; and every time each processing is executed, the event information 31 about the related region is created.

Incidentally, when creating the event information 31 about the related region(s), the event information aggregation server 30 records a combination of the region ID 333 and the event key 311 for specifying the related region, for which the event information 31 is to be created, in order to prevent the event registration processing of the related region(s) from entering an unlimited loop. Since the event key 311 is key information capable of uniquely specifying the inducing source event, the same value is used for the event information of the related regions which have the same inducing source event. Then, the event information aggregation server 30 continues the event registration processing for the related regions until the combination of the region ID 333 and the event key 311 matches a past processing record; and if the combination of the region ID 333 and the event key 311 matches the past processing record, the event information aggregation server 30 terminates the event registration processing for the related regions.

If the entire event registration processing for the related regions is completed, the event information aggregation server 30 sends an event registration completion notice to the management application server 20 to notify the management application server 20 of the completion of the event registration (step S122) and sends an event occurrence notice to the administrator terminal 50 to notify the administrator terminal 50 of the occurrence of the event (step S123). The event occurrence notice at least includes the event key 311 and is sent to the administrator terminal 50 by, for example, e-mail or other message transmission methods.

When the storage configuration information of the storage system 10 is set as a result of the processing in steps S101 to 123, the event notification system 1 creates the event information 31 including the event key 311 and the related region information 34 by setting the setting of the storage configuration information as the event and sends the event occurrence notice to the administrator terminal 50. Incidentally, regarding the information such as the screen information and the audit log information related to the created event information 31, its association with various IDs is registered in the event dictionary 32 and the information is stored as, for example, the screen information 22 or the audit log information 23 in the management application server 20. So, if the administrator browses the event information 31 as described later, such information can be provided easily from the management application server 20.

FIG. 15 shows a specific example of the event occurrence notice to be sent to the administrator. The event occurrence notice shown in FIG. 15 includes, in addition to the event key, descriptions of the event ID, the event type, the event region, and the event occurrence time as the event information and the setting content and storage information are described as the audit log information. Moreover, the event occurrence notice in FIG. 15 includes a description of a URL for GUI display as detailed event information display in order to browse a screen corresponding to the relevant event information.

The administrator who has received the event occurrence notice shown in FIG. 15 can find out by referring to the event information field that the event information to which the event key $Set_Pool_A_20120326$ is assigned is created for the reported event; this event is an event which corresponds to the event ID $1$ and is classified into a manual change of the setting; and the event occurred in a region indicated as the event region $S/N 001 Pool (1)$ at the event occurrence time $2012/03/26 01:06.020.$ Moreover, the administrator can find out the setting content, which is $Pool Extension,$ and the setting target pool ID from the audit log information field. Then, the administrator can browse detailed information of the relevant event occurrence notice by inputting the URL described in the detailed event information display field from the web browser 51 of the administrator terminal 50. Incidentally, the URL described in the detailed event information display field may be provided in a link format. Moreover, the event occurrence notice may not be configured by including a plurality of items as shown in FIG. 15, and only the event key may be sent to the administrator terminal 50.

(1-3-2) Event Occurrence Notice at the Time of Failure Occurrence

The processing for sending the event occurrence notice when setting the storage configuration information has been explained with reference to FIG. 14. Now, processing for sending the event occurrence notice at the time of the occurrence of a failure in the storage system 10 will be explained below in comparison with the processing in FIG. 14.

Firstly, the occurrence of a failure is set as an event, so the processing for setting the configuration information (steps S101 to S109 in FIG. 14) is not executed.

Then, if a failure occurs in the storage system 10, reference is made to the failure information 132 of the SVP 13 and information about the occurred failure is stored in the failure information 24 of the management application server 20. Next, the event notifying client 133, 41 detects the occurrence of the relevant failure and requests the event information aggregation server 30 to register the event (corresponding to step S111 in FIG. 14).

Subsequently, the event information aggregation server 30 creates the event information for each of a volume, which is an inducing source event occurrence region, and volumes, which are related regions, thereby completing the event registration; and the event occurrence notice is sent from the event information aggregation server 30 to the administrator terminal 50 (corresponding to steps S112 to S123 in FIG. 14).

If a failure occurs in the storage system 10, the event notification system 1 can send the event occurrence notice relating to the occurred failure to the administrator terminal 50 as a result of the above-described processing.

(1-3-3) Display of Event Browse Screen

Next, processing executed by the event notification system 1, when an event is selected by the administrator who has received the event occurrence notice, for displaying the event browse screen 52, which indicates information about the relevant event, on the administrator terminal 50 will be explained.

Figure 16:
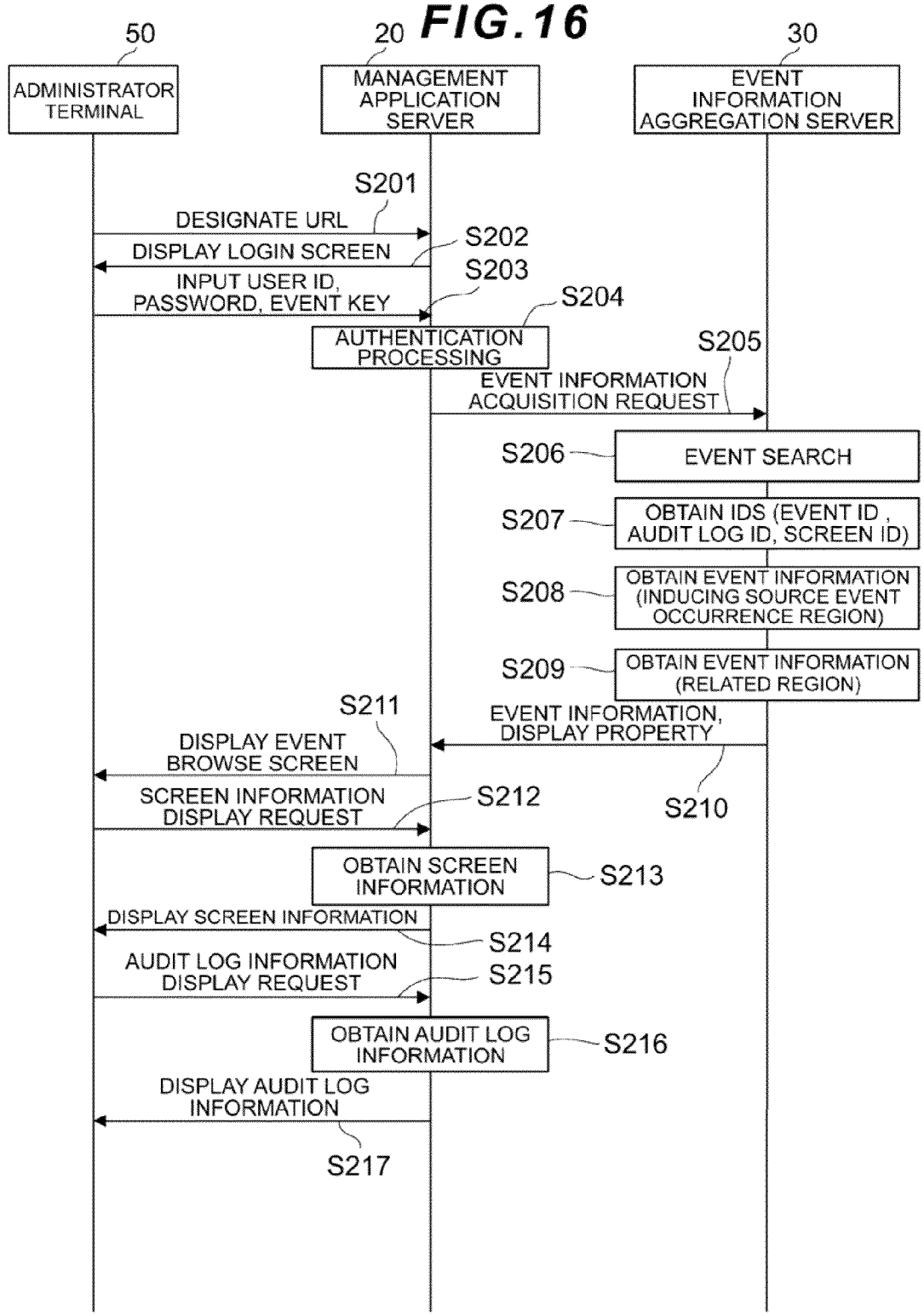
FIG. 16 is a sequence diagram showing a processing sequence executed by an event notification system 1 for displaying an event browse screen.

FIG. 16 is a sequence diagram showing a processing sequence executed by the event notification system for displaying the event browse screen. Firstly, it is assumed that the event occurrence notice is sent to the administrator terminal 50 by the processing indicated in step S123 in FIG. 14 and the event occurrence notice as illustrated in FIG. 15 is displayed on the web browser 51. It is further assumed that in the beginning state of FIG. 16, the storage management software 223 is executed by the management application server 20 and is provided to the web browser 51 of the administrator terminal 50 via the web server 221.

If the administrator performs the operation to input the URL described in the event occurrence notice to the administrator terminal 50 under this circumstance, the administrator terminal 50 sends the designated URL to the management application server 20 (step S201). Having received the URL, the management application server 20 has the administrator terminal 50 display a specified login screen (step S202).

Figure 17:
FIG. 17 is a screen display example displayed on a web browser of an administrator terminal.

FIG. 17 is a screen display example displayed on the web browser of the administrator terminal. For example, it is assumed in step S202 that a login screen shown in FIG. 17(a) is displayed on the web browser 51. The login screen shown in FIG. 17(a) is provided with fields for inputting a user ID, a password, and an event key. When the administrator inputs the required input items (for example, the user ID, the password, and the event key) on the login screen, the administrator terminal 50 sends the input information to the management application server 20 (step S203). Now, the explanation will continue, assuming that the event key whose inducing source event is, for example, $Pool Extension$ has been input. The $Pool Extension$ is one of the processing for which the storage configuration information is set.

Incidentally, the $event key$ on the login screen corresponds to the event key described in the event occurrence notice and the relevant event key may be directly input or information corresponding to the event key may be embedded in the URL in advance so that if the URL in the event occurrence notice is input, the login screen will be displayed with the relevant event key already entered in the event key field.

Having received the input items of the login screen, the management application server 20 executes the authentication processing (step S204); and if a normal authentication result is obtained, the management application server 20 sends a request to the event information aggregation server 30 to obtain the relevant event information in order to display a screen based on the event information corresponding to the event key (step S205).

Having received the event information acquisition request, the event information aggregation server 30 refers to the event dictionary 32 and searches for the event content corresponding to the entered event key (step S206). Then, the event information aggregation server 30 obtains various IDs (such as the event ID, the audit log ID, and the screen ID) described in the event content found as the result of the search in step S206 (step S207). Then, the event information aggregation server 30 searches for information managed by the event information aggregation server 30 based on, for example, the event key and the various IDs and obtains the event information 31 about the inducing source event occurrence region whose inducing source event is the event indicated by the relevant event key (step S208).

Next, the event information aggregation server 30 refers to the related region information 34 of the event information 31 obtained in step S208 and obtains the event information having the same event key as that of the event information 31 obtained in step S208 with respect to each related region described in the related region information 34 (step S209). The acquisition of the event information of the related regions in step S209 is performed as many times as the number of the related regions described in the related region information 34. Incidentally, the event information aggregation server 30 records a combination of the region ID and the event key for specifying the related region, for which the event information is to be obtained in the same manner as the method explained in FIG. 14 for the event registration processing for the related regions, in order to prevent the acquisition of the event information of the related regions from entering an unlimited loop; and if the combination matches a past processing record, the event information aggregation server 30 terminates the acquisition of the event information for the related regions.

When the entire processing for the acquisition of the event information of the related regions is completed, the event information manager 323 of the event information aggregation server 30 sets a necessary display property to display a screen based on the event information 31. Then, the event information aggregation server 30 sends the event information 31 and the display property to the management application server 20 (step S210). The processing executed by the event information manager 323 for setting the display property will be explained later with reference to FIG. 18.

Then, the management application server 20 executes processing for rendering a screen based on the event information 31 in accordance with the display property received by the storage management software 223 from the event information aggregation server 30 and has the web browser 51 of the administrator terminal 50 display the screen (step S211). The screen displayed on the web browser 51 in step S211 as described above corresponds to the event browse screen 52 for displaying the relativity of the region, in which the event occurred, to its related region(s).

In step S211, for example, an event browse screen as shown in FIG. 17(b) is displayed. The event browse screen in FIG. 17(b) shows a volume, in which the event occurred, and volumes of the related regions in a tree form and detailed information about the selected component (for example, $Device A_Pool A$) is displayed. For example, it is displayed in the right half of FIG. 17(b) that an audit log $Add Pool Vol (Pool A)$ exists and, for example, $Device A_VVOL (1)$ and $Device B_LDEV (2)$ exist as the related regions. Moreover, referring to FIG. 17(b), different display sizes are used for the components, depending on the relativity of the relevant component to the inducing source event. For example, the component $Device A_Pool A$ which is displayed in a large letter size means that its relativity is strong; and the component $Device A_VVOL (2)$ which is displayed in a smaller letter size means that its relativity is weak. The degree of relativity of the relevant component to the inducing source event is judged by referring to the relativity strength 343 of the related region information 34 in the event information 31. Then, as specified operations are performed by the administrator with respect to such an event browse screen 52, the administrator terminal 50 provides specific detailed information such as snapshots and audit logs.

For example, if the operation to request the display of the screen information when $Pool Extension$ is performed is executed by the administrator, the administrator terminal 50 sends a screen information display request to the management application server 20 (step S212). Having received the screen information display request, the management application server 20 obtains the screen ID corresponding to the event key from the registered content of the event key 311 registered in the event dictionary 32 based on the event information 31 received in step S210 and further obtains the screen information 22 corresponding to the obtained screen ID from the setting/failure information 21 stored in the HDDs 213 (step S213). The screen information 22 obtained in step S213 corresponds to, for example, the screen information 22 stored in step S106 in FIG. 14. Then, as the management application server 20 sends the obtained screen information 22 to the administrator terminal 50, a snapshot of the storage configuration information which was taken when $Pool Extension$ was performed is displayed on the web browser 51 of the administrator terminal 50 (step S214).

Furthermore, for example, if the operation to request the display of the audit log information when $Pool Extension$ was performed is executed by the administrator, the administrator terminal 50 sends an audit log information display request to the management application server 20 (step S215). Having received the audit log information display request, the management application server 20 obtains the audit log ID corresponding to the event key from the registered content of the event key 311 registered in the event dictionary 32 based on the event information received in step S210 and further obtains the audit log information 23 corresponding to the obtained audit log ID from the setting/failure information 21 stored in the HDDs 213 (step S216). The audit log information 23 obtained in step S216 corresponds to, for example, the audit log information 23 stored in step S107 in FIG. 14. Then, as the management application server 20 sends the obtained audit log information 23 to the administrator terminal 50, an audit log when $Pool Extension$ was performed is displayed on the web browser 51 of the administrator terminal 50 (step S217).

Figure 18:
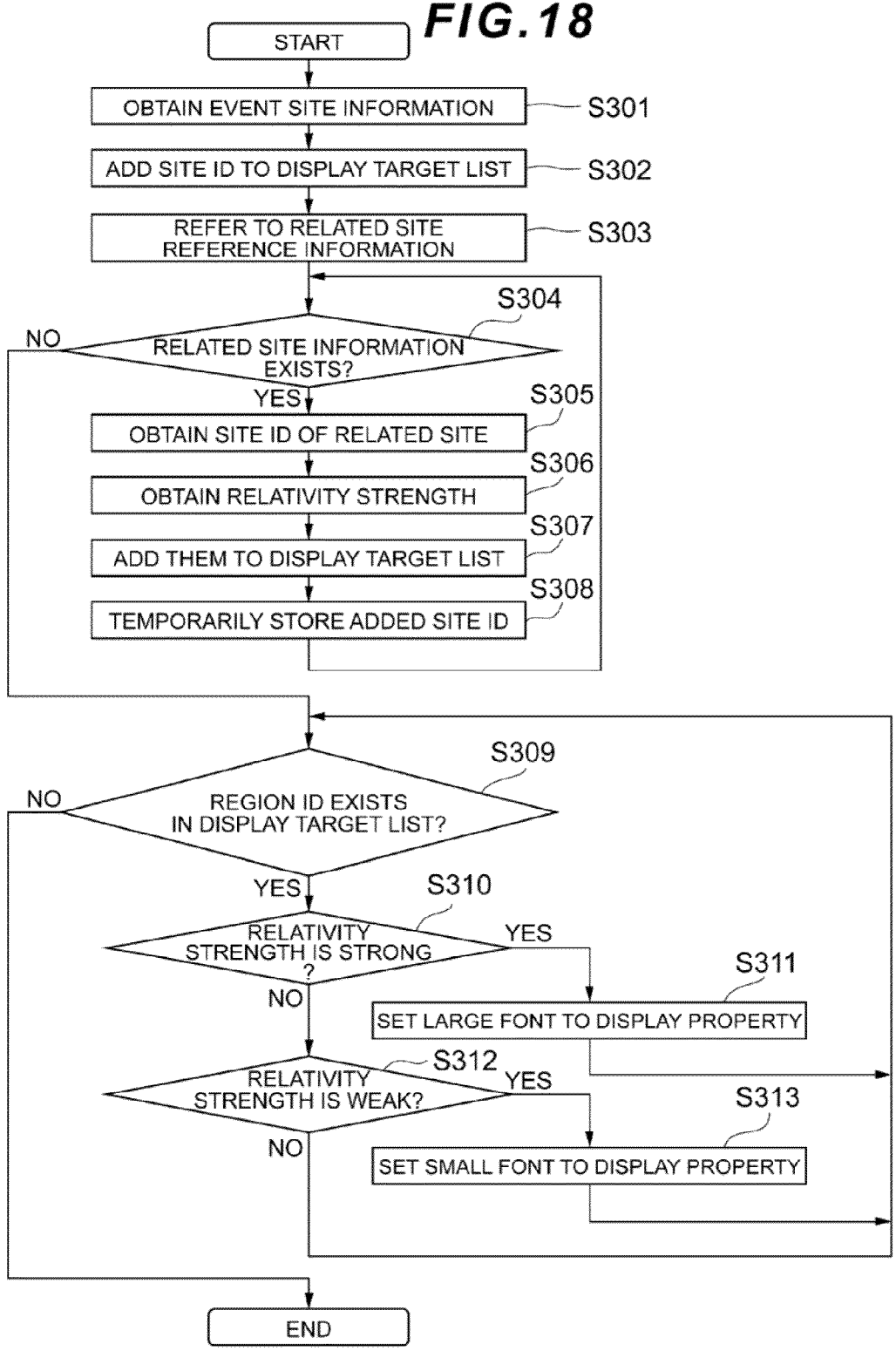
FIG. 18 is a flowchart illustrating a processing sequence executed by an event information manager for setting a display property.

Now, the setting of the display property in step S210 will be explained. FIG. 18 is a flowchart showing a processing sequence executed by the event information manager for setting the display property.

Firstly, the event information manager 323 obtains the event region information 33 from the event information 31 (step S301) and adds the region ID 333 to the display target list 328 (step S302). Next, the event information manager 323 refers to the related region reference information 315 (step S303) and judges whether or not the related region information 34 exists at the related region reference information 315 where the reference has been made (step S304). If the related region information 34 does not exist in step S304 (NO in step S304), the processing proceeds to step S309.

If the related region information 34 exists in step S304 (YES in step S304), the event information manager 323 obtains the region ID and the relativity strength 343, which are described in the related region 341, from the related region information 34 (steps S305 and S306) and adds them to the display target list 328 (step S307). Then, the event information manager 323 temporarily stores the region ID of the related region(s) 341 which has been added to the display target list 328 (step S308).

Subsequently, the processing proceeds to step S304 and the event information management manager 323 judges whether the related region information 34 including the related region 341, in which an unprocessed region ID is described, exists or not; and if such a related region information 34 exists, the processing from step S305 to S308 is repeated and the region IDs and the relativity strength 343 of all the related regions are added to the display target list 328. Then, the processing proceeds to processing in step S309.

In step S309, the event information manager 323 judges whether or not the region ID is registered in the display target list 328 (step S309); and if the region ID is not registered, the processing is terminated.

If the region ID is registered in step S309 (YES in step S309), the event information manager 323 judges whether or not the relativity strength 343 which is registered in a combination with the relevant region ID is $Strong$ (step S310). If the relativity strength 343 is $Strong$ (YES in step S310), the event information manager 323 sets the display property of the related region indicated by the region ID to a specified font which is larger than a standard setting (step S311) and then returns to the processing in step S309. If the relativity strength 343 is not $Strong$ (NO in step S310), the event information manager 323 judges whether or not the relativity strength 343 is $Weak$ (step S312). If the relativity strength 343 is not $Weak$ in step S312 (NO in step S312), the event information manager 323 returns to the processing in step S309; and if the relativity strength 343 is $Weak$ (YES in step S312), the event information manager 323 sets the display property of the related region indicated by the region ID as a specified font smaller than the standard setting (step S313) and then returns to the processing in step S309.

While an unprocessed region ID is registered in the display target list 328 in step S309, the processing of steps S310 to S313 is repeated with respect to the relativity strength 343 registered in a combination with the region ID; and the processing is executed on all the region IDs registered in the display target list 328 and then is terminated.

As a result of the processing of steps S301 to S313 as described above, the related regions with different letter sizes depending on the relativity strength are displayed on the event browse screen 52 rendered in step S211 in FIG. 16.

Incidentally, the processing executed when $Pool Extension$ which is one of the processing for setting the storage configuration information is set as the event key has been explained with reference to FIG. 16; and the event browse screen can be also displayed with respect to an event key, for which the occurrence of a failure is set as an event, by the same processing as the processing shown in FIG. 16. However, as a general rule, an audit log is not obtained when a failure occurs; so, the audit log information is not displayed, but the failure information 24 is displayed instead in response to a failure information display request.

(1-3-4) Event Information Deletion Flow (Certain Time Standard)

Since the event information 31 is created in response to the occurrence of an event in the event notification system 1 as described above, the event information 31 stored in the event information aggregation server 30 increases along with the elapse of time. Therefore, the stored event information 31 is sometimes deleted in the event notification system 1. Processing executed by the event notification system 1 for setting arbitrary time as reference time and deleting older event information 31 than the reference time will be explained below.

Figure 19:
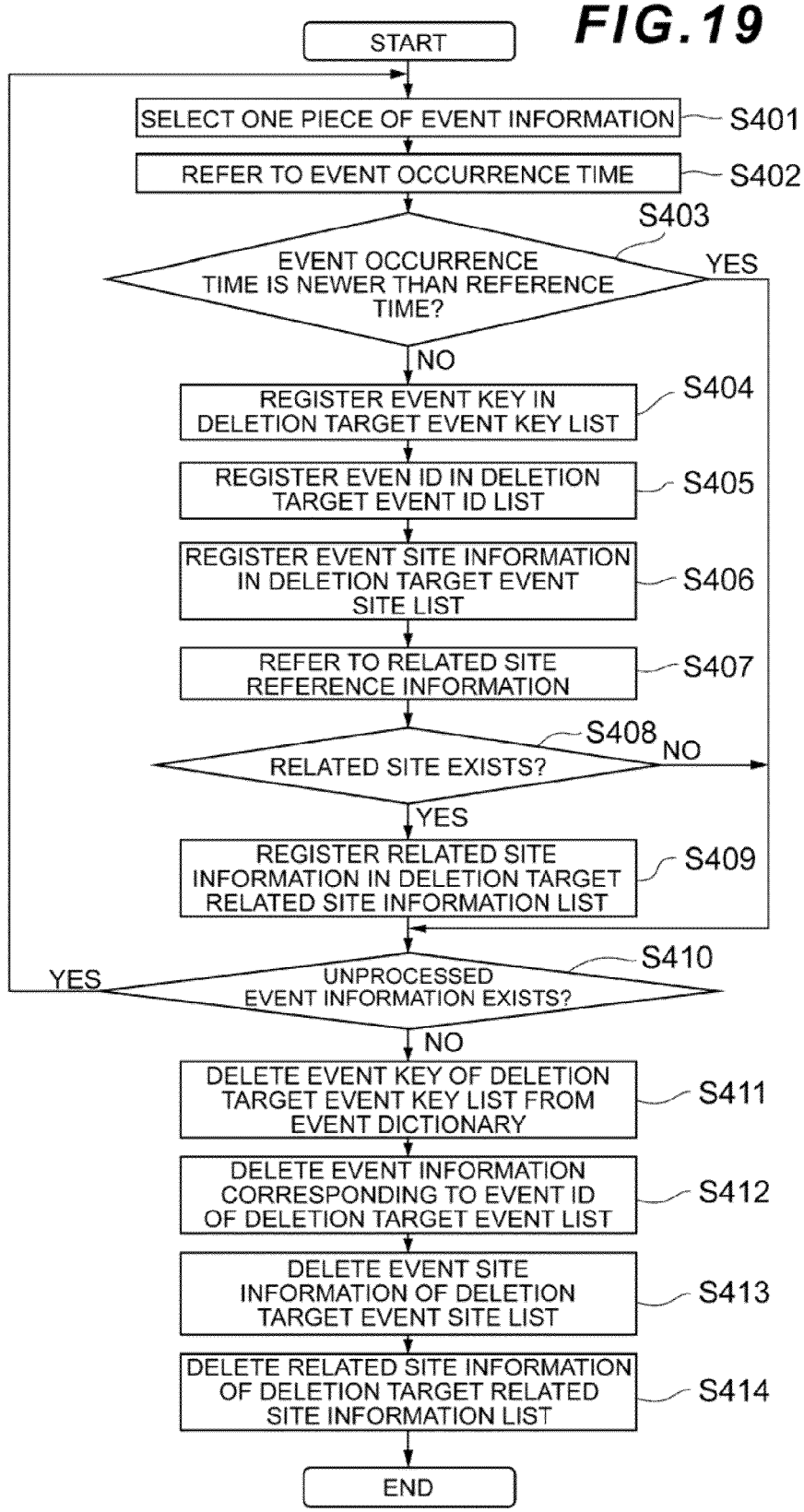
FIG. 19 is a flowchart illustrating a processing sequence for deleting event invention that is older than reference time.

FIG. 19 is a flowchart showing a processing sequence for deleting older event information than the reference time. The entire processing of FIG. 19 is executed by the event information management manager 323 in the event information aggregation server 30 explained with reference to FIG. 8. Incidentally, it is assumed that the reference time is input in advance by, for example, the administrator to a screen of the storage management software 523 displayed on the web browser 51 of the administrator terminal 50. The reference time which is input from the administrator terminal 50 is sent by the storage management software 223 provided by the management application server 20 to the event information aggregation server 30 and is then obtained by the event information management manager 323.

Firstly, the event information management manager 323 selects one piece of event information 31 from a plurality of pieces of event information stored in the HDDs 303 (step S401). Then, the event information management manager 323 refers to the event occurrence time 316 of the selected event information 31 (step S402) and then judges whether or not the event occurrence time to which reference has been made is newer than the reference time (step S403). If the event occurrence time is newer than the reference time (NO in step S403), it is determined that the relevant event information should not be deleted. So, the processing proceeds to processing of step S408.

If the event occurrence time is not newer than the reference time (NO in step S403), it is determined that the event information should be deleted. When this happens, the event information management manager 323 registers the event key 311, the event ID 312, and the event region information 314 of each piece of event information 31 in the deletion target event key list 327, the deletion target event ID list 324, and the deletion target event region list 325, respectively (steps S404 to S406).

Next, the event information management manager 323 refers to the related region reference information 315 of the relevant event information 31 (step S407) and then judges whether the related region information 34 exists or not (step S408). If the related region information 34 exists in step S408 (YES in step S408), the event information management manager 323 registers the related region information 34 in the deletion target related region information list 326 (step S409) and then proceeds to processing of step S410. Moreover, if the related region information 34 does not exist in step S408 (NO in step S408), the processing proceeds to processing of step S410.

In step S410, the event information management manager 323 judges whether or not any unprocessed event information 31 on which the processing of steps S401 to S409 has not been executed exists in the HDDs 303. If any unprocessed event information 31 exists in step S410 (YES in step S410), the event information management manager 323 returns to step S401 and selects the unprocessed event information 31.

If any unprocessed event information 31 does not exist in step S410 (NO in step S410), the event information management manager 323 deletes the item corresponding to the event key 311, which was registered in the deletion target event key list 327 in step S404, from the event dictionary 32 (step S411). Then, the event information management manager 323 deletes the event information 31 corresponding to the event ID 312, which was registered in the deletion target event ID list 324 in step S405, from the HDDs 303 (step S412), and deletes the event region information 314, which was registered in the deletion target event region list 325 in step S406, from the HDDs 303 (step S413). Furthermore, the event information management manager 323 deletes the related region information 34, which was registered in the deletion target related region information list 326 in step S409, from the HDDs 303 (step S414), and then terminates the processing.

Incidentally, the processing of steps S404 to S406 and the processing of steps S411 to S414 may be executed by changing their order.

As a result of the processing of steps S401 to S414 described above, the event information management manager 323 can delete the event information 31 of an event, which occurred at older time than the reference time, including the event information of its related region(s).

(1-3-5) Event Information Deletion Flow (Event Key Standard)

Next, processing executed by the event notification system 1 for deleting the event information 31 by targeting an arbitrary event key will be explained.

Figure 20:
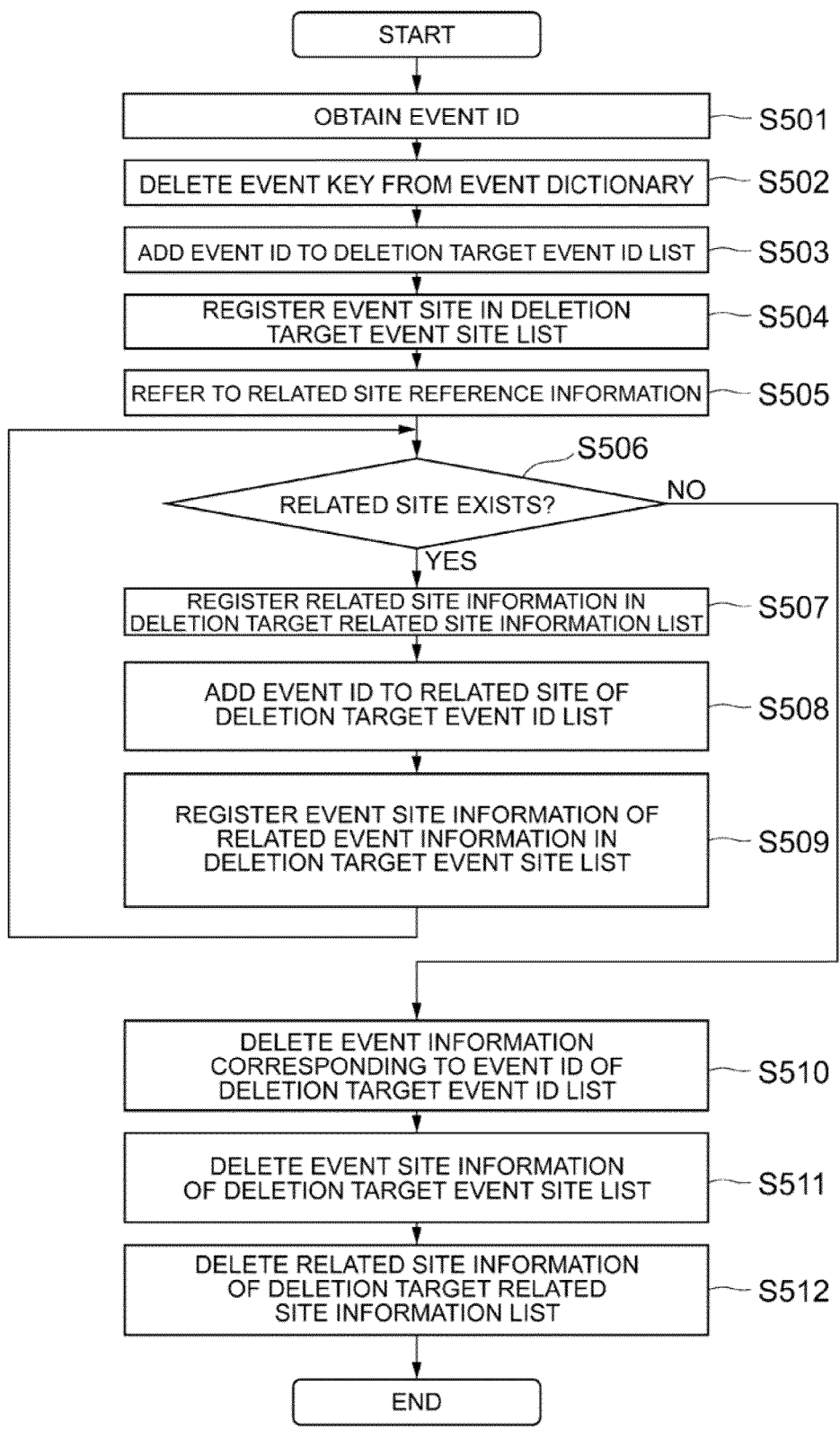
FIG. 20 is a flowchart illustrating a processing sequence for deleting the event information based on an event key.

FIG. 20 is a flowchart showing a processing sequence for deleting the event information based on an event key. The entire processing of FIG. 20 is executed by the event information management manager 323 in the event information aggregation server 30 explained with reference to FIG. 8. Incidentally, it is assumed that an event key which is a deletion target (designated event key to be deleted) is input in advance by, for example, the administrator to a screen of the storage management software 523 displayed on the web browser 51 of the administrator terminal 50. The designated event key to be deleted, which is input from the administrator terminal 50, is sent by the storage management software 223 provided by the management application server 20 to the event information aggregation server 30 and is then obtained by the event information management manager 323.

Firstly, the event information management manager 323 searches the event dictionary 32 stored in the HDDs 303, obtains the event ID 312 corresponding to the designated event key to be deleted (step S501), and deletes the item of the event key 311 corresponding to the designated event key to be deleted from the event dictionary 32 (step S502).

Next, the event information management manager 323 obtains the event information 31 corresponding to the event ID 312 obtained in step S501 from the plurality of pieces of event information stored in the HDDs 303, registers the event ID 312 of the relevant event information 31 in the deletion target event ID list 324 (step S503), and registers the event region information 314 of the relevant event information 31 in the deletion target event region list 325 (step S504).

Next, the event information management manager 323 refers to the related region reference information 315 of the event information 31 obtained in step S503 (step S505) and then judges whether or not the related region information 34 exists at the related region reference information 315 where reference has been made (step S506). If the related region information 34 does not exist (NO in step S506), the processing proceeds to processing of step S510.

If the related region information 34 exists in step S506 (YES in step S506), the event information management manager 323 registers the related region information 34 in the deletion target related region information list 326 (step S507) and registers the event ID, which is described in the related event 342 field of the related region information 34, in the deletion target event ID list 324 (step S508). Furthermore, the event information management manager 323 refers to the event information corresponding to the event ID registered in step S508. Specifically speaking, the event information management manager 323 refers to the event information of the related region and registers the event region information of the event information of the related region in the deletion target event region list 325 (step S509).

Subsequently, returning back to step S506, the event information management manager 323 repeats the processing of steps S507 to S509 until any unprocessed related region information 34 no longer exists at the related region reference information 315 to which reference is made; and after the processing, the event information management manager 323 proceeds to processing of step S510.

In step S510, the event information management manager 323 deletes the event information 31 corresponding to the event ID, which was registered in the deletion target event ID list 324 in step S508, from the HDDs 303. Then, the event information management manager 323 deletes the event region information, which was registered in the deletion target event region list 325 in step S609, from the HDDs 303 (step S511). Furthermore, the event information management manager 323 deletes the related region information 34, which was registered in the deletion target related region information list 326 in step S507, from the HDDs 303 (step S512), thereby terminating the processing.

As a result of the processing of steps S501 to S512 as described above, the event information management manager 323 can deletes the event information 31 related to the relevant event key, including the event information of the related region(s), based on the designated event key.

(1-4) Advantageous Effects of First Embodiment

If an event occurs in the storage system 10 of the event notification system 1 configured as described above, the setting/failure information 21, which is information about the occurred event and its related event(s) is stored in the management application server 20, and the event information 31 including the event key 311 and the related region information 34 for associating the occurred event with the setting/failure information 21 is created at the event information aggregation server 30, and only the event occurrence notice including the event key is sent to the administrator terminal 50. So, the information to be delivered to the administrator at the time of the occurrence of the event can be limited to the minimal necessary information.

Then, with such an event notification system 1, the event browse screen 52 indicating the relativity of the occurrence region of the inducing source event (for example, the region indicated by the region ID 333) to the region, in which its related event occurred (for example, the region stored in the related region field 341) is displayed on the administrator terminal 50 based on the event information 31 of the relevant event with respect to the selected event from the event occurrence notice received by the administrator. So, the administrator can understand not only the inducing source event, but also the relativity of the inducing source event to the related event about the event for which the information is required. Moreover, if one volume is selected with the event notification system 1 by the administrator from the event browse screen 52, on which the volume where the event occurred is displayed, the setting/failure information 21 about the selected volume is provided. So, the information about the occurred event can be provided according to a request level from the administrator.

Moreover, such an event notification system 1 is configured so that the storage configuration information of each storage system 10 can be obtained from the plurality of storage systems 10 by using the configuration information setting reference API 134, 42. So, the configuration information between the plurality of storage systems 10 can be managed without being affected by the management form of the storage systems 10. Specifically speaking, a general storage system uses the operation management software for the storage operation and management and, for example, data input/output and setting of the storage configuration are performed under the management of the operation management software. Therefore, conventionally, the configuration information between the storage systems under control of the same type of operation management software can be obtained, but the configuration information between the storage systems under control of different types of operation management software cannot be obtained or managed. However, with the event notification system 1 according to the first embodiment, reference can be made to each of the storage configuration information 131A, 131B of the storage systems 10A, 10B by using, for example, the configuration information setting reference APIs 134A, 134B, respectively and reference can be made to the storage configuration information 131C of the storage system 10C by using the configuration information setting reference API 42. So, the storage configuration information 131 can be obtained independently from the operation management software in the storage system 10. Specifically speaking, the event notification system 1 can manage the configuration information between the storage systems 10 with respect to the plurality of storage systems 10 under control of different types of operation management software.

Therefore, if such an event notification system 1 is used, not only the storage configuration information in each storage system 10, but also the configuration information between the storage systems 10 can be managed with respect to the plurality of storage systems 10; and, furthermore, only the information corresponding to the selected event key is provided to the administrator, thereby producing the advantageous effects that the events which occurred in the storage system(s) can be managed easily regardless of complexity of the storage configuration.

Moreover, if such an event notification system 1 is used, the information delivered to the administrator at the time of the occurrence of the event is limited to the minimal necessary information. So, a traffic volume required for transmission of the event occurrence notice can be reduced and the effect of curbing communications costs can be also expected.

Moreover, if such an event notification system 1 is used, the event information is created upon the occurrence of an event based on the storage configuration information with respect to not only the event, which is the inducing source, but also its related event(s) which occurs as a result of the occurrence of the inducing source event and the event information of the inducing source event and the event information of the related event(s) are managed by associating them with each other, so that the relativity of the inducing source event occurrence region to the related event occurrence region can be displayed on the event browse screen 52. So, the volume(s) indirectly affected by the occurrence of the event can be reported to the administrator with certainty. Then, to clearly indicate the relativity between the plurality of volumes to the administrator is effective particularly when the plurality of storage systems 10 has a large-scale configuration or a complicated configuration; and the administrator can examine countermeasures at the time of the occurrence of a failure or change the storage configuration in consideration of the influence range of the occurred event in the storage systems 10 and the advantageous effect of enhancing the safety in the management of the plurality of storage systems 10 can be expected.

Moreover, with such an event notification system 1, the display property of a volume to be displayed on the event browse screen 52 is changed according to the relativity strength 343 of the event information 31, thereby making it possible to visually present the relativity between the volumes to the administrator.

Moreover, with such an event notification system 1, only the event information screen corresponding to the event key is displayed on the event browse screen 52; and if the event browse screen 52 is displayed, the authentication processing is required. So, it is unnecessary to perform account management for each user according to a browse level and it is possible to easily secure the security for browsing the occurred event.

Moreover, if the event information 31 is to be deleted with the event notification system 1, the event information of the inducing source event together with the event information of the related event is deleted based on the relativity between the volumes. So, for example, the processing for deleting the event information which is no longer necessary due to a change of the storage configuration can be executed easily and the information in the storage systems configured in a complicated manner can be deleted easily.

Moreover, with such an event notification system 1 as compared to an event management system of a conventional storage system for delivering log information of the occurred event by using automatic delivery of e-mail, bothersome work of a receiver due to automatic delivery of e-mail can be solved and the burden in terms of security management such as management of a plurality of user accounts and mail addresses can be reduced.

(2) Second Embodiment

Figure 21:
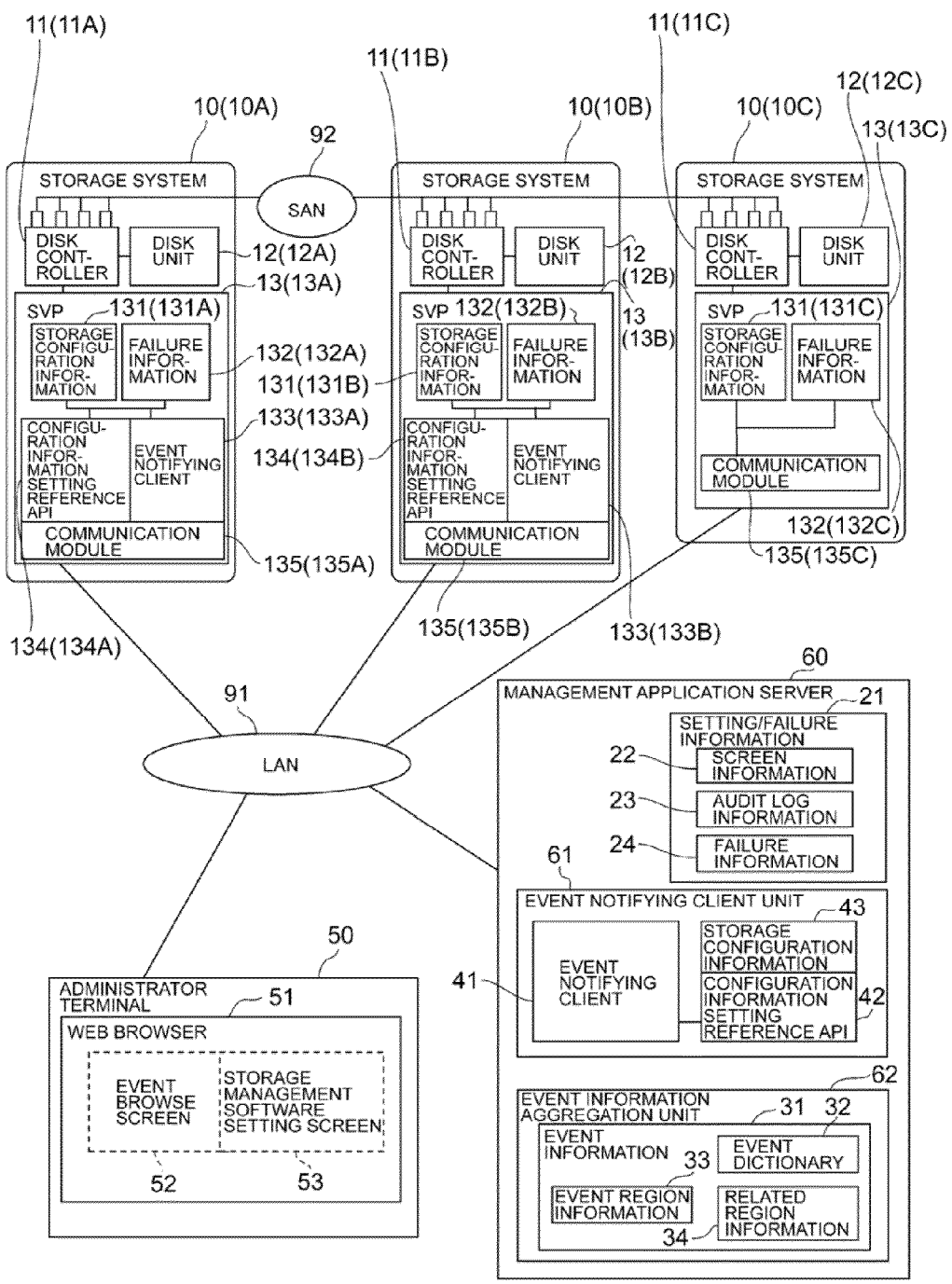
FIG. 21 is a block diagram showing a configuration example of an event notification system according to a second embodiment.

FIG. 21 is a block diagram showing a configuration example of an event notification system according to a second embodiment. An event notification system 2 in FIG. 2 has the same configuration as that of the event notification system 1 according to the first embodiment, except that a management application server 60 is configured to include an event notifying client unit 61 and an event information aggregation unit 62. The event notifying client unit 61 corresponds to the configuration management apparatus 40 shown in FIG. 1 and the event information aggregation unit 62 corresponds to the event information aggregation server 30 shown in FIG. 1. The components which are common with the event notification system 1 will be explained, using the element numbers indicated in FIG. 1 to FIG. 3, FIG. 5 to FIG. 7, and FIG. 9 to FIG. 12.

Figure 22:
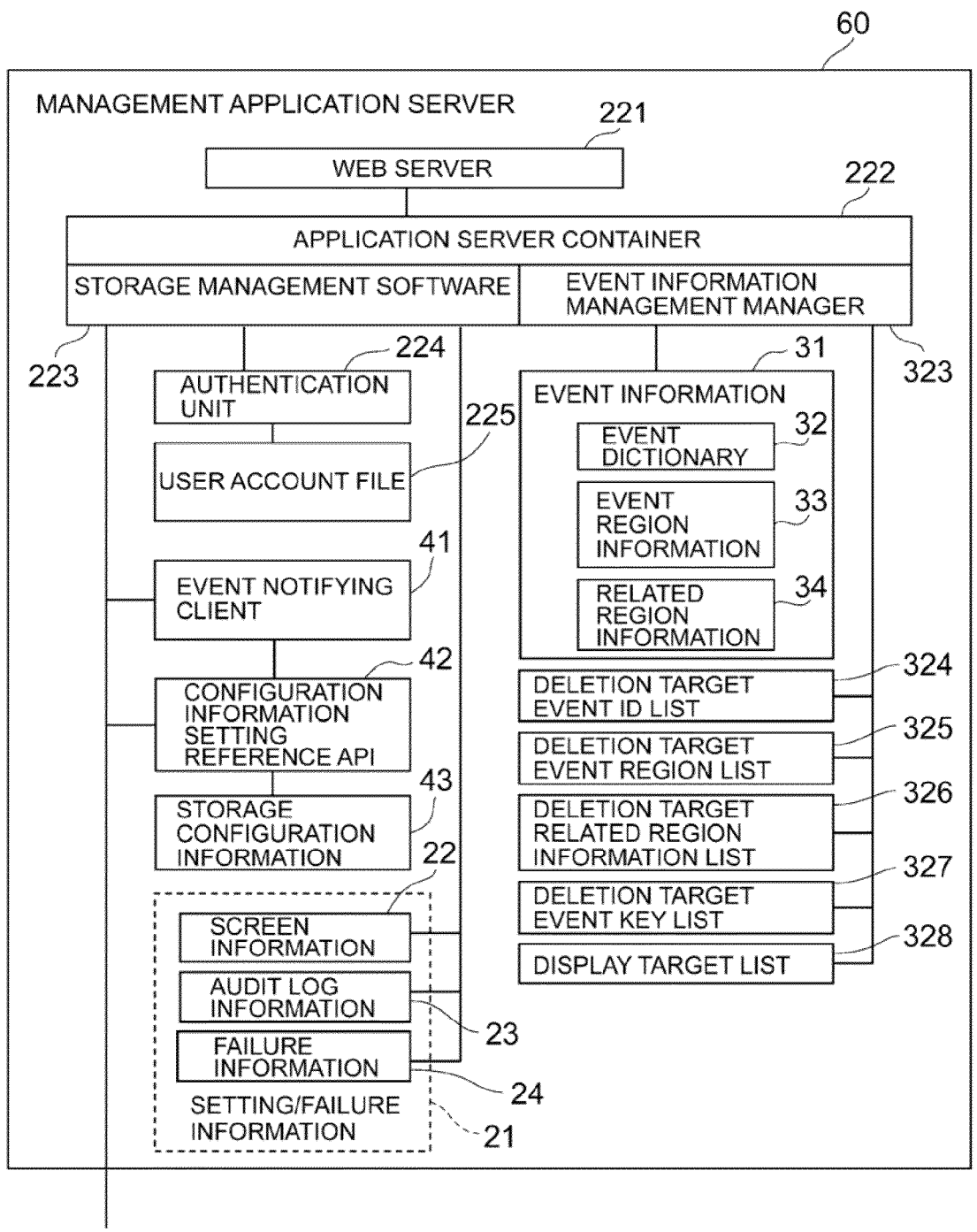
FIG. 22 is a conceptual diagram showing a functional configuration of a management application server shown in FIG. 21.

The hardware configuration of the management application server 60 is the same as the hardware configuration of the management application server 20 shown in FIG. 5 and its explanation has been omitted. FIG. 22 is a conceptual diagram showing a functional configuration of the management application server shown in FIG. 21. The event information management manager 323 is implemented by the CPU 211 operating in accordance with the programs stored in the memory 212 or the HDDs 213 and executed. The event information management manager 323 communicates with the storage system 10 and the administrator terminal 50 via the web server 221. The event information 31 is stored in the HDDs 213; and the deletion target event ID list 324, the deletion target event region list 325, the deletion target related region information list 326, the deletion target event key list 327, and the display target list 328 are stored in the memory 212 or the HDDs 213.

The management application server 60 configured as described above has a function corresponding to that of the event information aggregation server 30 in the event notification system 1. So, when an event occurs in the storage system 10, the management application server 60 can aggregate and store the event information 31 in the same manner as the event information aggregation server 30 according to the first embodiment.

Moreover, the management application server 60 configured as described above has a function corresponding to that of the configuration management apparatus 40 in the event notification system 1. So, even if the SVP 13 of the storage system 10 is not equipped with the event notifying client 133 or the configuration information setting reference API 134, the management application server 60 can detect the occurrence of an event in the storage system 10 and request the event information management manager 323 to execute the event registration.

Therefore, the event notification system 2 configured as described above can detect the occurrence of an event in the storage system 10, create the event information of the relevant event, and report the event key without depending on the configuration of the storage system 10. So, the advantageous effect of compatibility with various storage systems 10 can be expected in addition to the advantageous effects of the event notification system 1 according to the first embodiment.

(3) Third Embodiment

An event notification system according to a third embodiment is characterized in that current storage configuration information can be displayed in addition to the screen information at the time of the occurrence of an event. The configuration of the event notification system according to the third embodiment is the same as that of the event notification system 1 shown in FIG. 1 or the event notification system 2 shown in FIG. 21; and an explanation will be given below by using the configuration of the event notification system 1.

When an event occurs in the event notification system according to the third embodiment, the event information aggregation server 30 creates the event information 31 in response to an event registration request from the event notifying client 133; and the processing until the event key is reported to the administrator terminal 50 is the same as the processing by the event notification system 1 according to the first embodiment.

Figure 23:
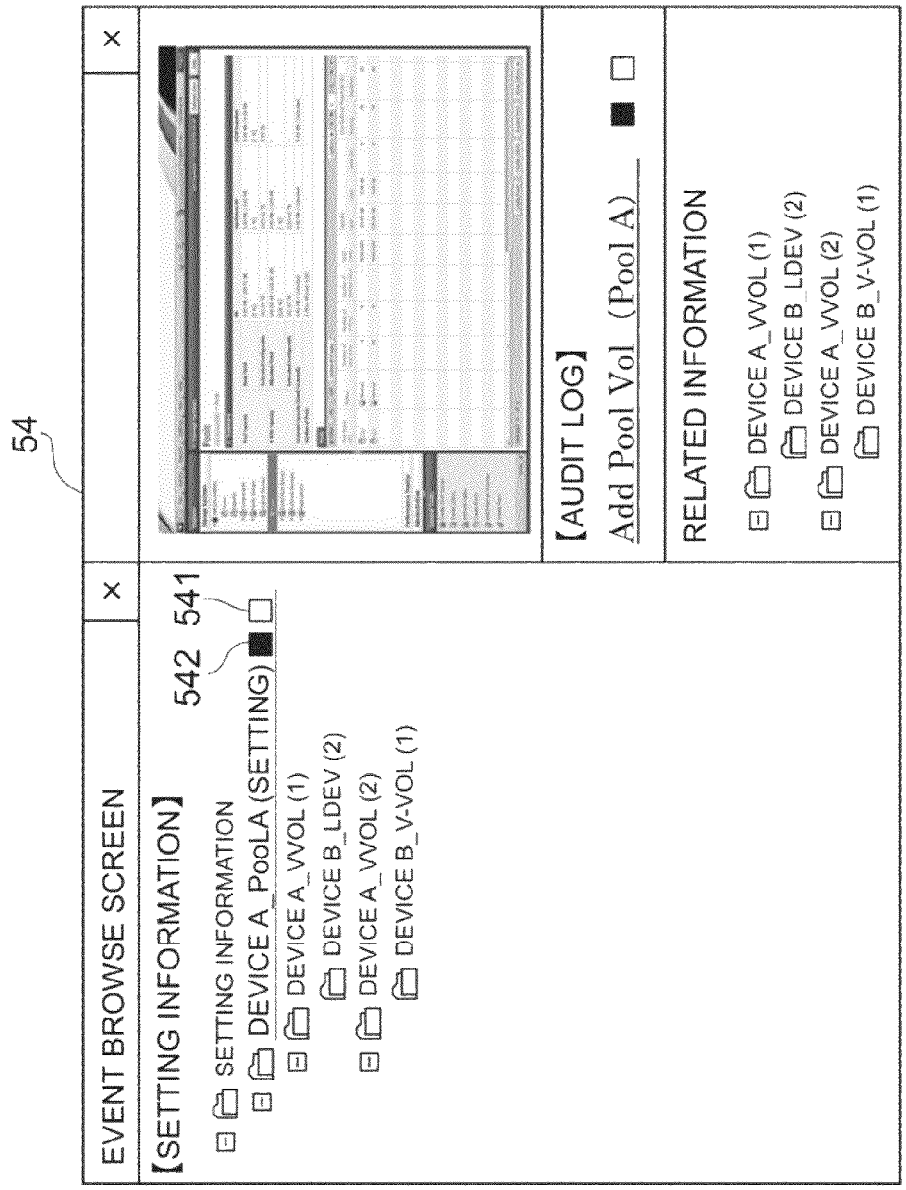
FIG. 23 is a display example showing an example of an event browse screen in an event notification system according to a third embodiment.

Subsequently, if the administrator who has received the event occurrence notice selects an event, an event browse screen is displayed on the administrator terminal 50 as in the first embodiment. FIG. 23 is a display example showing an example of the event browse screen in the event notification system according to the third embodiment. On an event browse screen 70 shown in FIG. 23, a button 541 for displaying the storage configuration information at the time of the occurrence of the event and a button 542 for displaying the current storage configuration information are displayed.

If the button 541 is selected by the input operation by the administrator when the event browse screen 70 in FIG. 23 is displayed on the web browser 51 of the administrator terminal 50, the same processing as the processing in steps S213 to S214 in FIG. 16 is executed in the management application server 20 and a snapshot showing screen information at the time of the occurrence of the event is displayed on the administrator terminal 50. Moreover, if the button 542 is selected by the input operation by the administrator, the storage management software 223 executed in the management application server 20 obtains a snapshot of the current storage configuration information by using the configuration information setting reference API 134 of the storage system 10 and displays the obtained snapshot on the web browser 51 of the administrator terminal 50.

Such an event notification system according to the third embodiment can provide not only the storage configuration at the time of the occurrence of an event, but also the current storage configuration in response to a request from the administrator. So, if the relativity of the storage configuration has changed after the occurrence of the event, the related information at the time of the occurrence of the event can be compared with the current related information and the administrator can understand a phenomenon attributable to the event more accurately. Moreover, as the latest related information is provided, the administrator can examine countermeasures at the time of the occurrence of a failure and change the storage configuration while perceiving the influence range more accurately; and, therefore, the advantageous effect of enhancing safety in management of the storage systems can be expected.

(4) Other Embodiments

Incidentally, the case where the font of the display property of a volume displayed on the event browse screen 52 is changed according to the relativity strength 343 has been described with respect to the event notification systems according to the aforementioned first to third embodiments; however, the present invention is not limited to this example and, for example, the display property of a volume displayed on the event browse screen 52 may be set by applying different contrast as a display concentration according to the relativity strength 343 or different display colors may be applied. Moreover, besides changing the volume display method depending on the related region, the event browse screen 52 may be set so that, for example, the display method will be changed depending on whether the relevant volume is a logical volume or a physical volume.

Moreover, the case where the configuration management apparatus 40 registers an event which occurred in the storage system 10C has been described with respect to the event notification system 1 according to the aforementioned first embodiment; however, the present invention is not limited to this example and, for example, the event notification system 1 may be configured so that the configuration management apparatus 40 refers to the storage configuration information with respect to all the storage systems 10A to 10C and registers the event in cooperation with the event information aggregation server 30 at the time of the occurrence of the event. In such a case, the event notification system 1 can detect the occurrence of an event in the storage system 10, create the event information of the relevant event, and report the event key without depending on the components of the storage system 10, so that it is possible to deal with various storage system 10.

Moreover, the event notification system 1 according to the aforementioned first embodiment has been explained as if the management application server 20, the event information aggregation server 30, and the configuration management apparatus 40 are separate devices; however, the present invention is not limited to this example and, for example, the event notification system 1 can be configured so that the components of the configuration management apparatus 40 are mounted in the event information aggregation server 30.

Moreover, the case where the management application server 60 includes the event notifying client unit 61 has been explained with respect to the event notification system 2 according to the aforementioned second embodiment; however, the present invention is not limited to this example. For example, if each storage system 10 is equipped with the event notifying client for detecting the occurrence of the event information and the configuration information setting reference API capable of referring to and obtaining the storage configuration information, the management application server 60 does not have to be equipped with the event notifying client unit 61. Also, if the storage system 10 which is not equipped with the event notifying client and the configuration information setting reference API like the storage system 10C shown in FIG. 22 exists under the above-described circumstance, the configuration management apparatus 40 shown in FIG. 1 may be provided instead.

REFERENCE SIGNS LIST

1, 2 Event notification system
10 (10A to 10C) Storage system
11 Disk controller
12 Disk unit
13 SVP
131 (131A, 131B), 43 Storage configuration information
132 Failure information
133 (133A, 133B), 41 Event notifying client
134 (134A, 134B), 42 Configuration information setting reference API
20, 60 Management application server
21 Setting/failure information
222 Application server container
223 Storage management software 30 Event information aggregation server
31 Event information
32 Event dictionary
33 Event region information
34 Related region information
40 Configuration management apparatus
50 Administrator terminal
51 Web browser
52, 70 Event browse screen
91 LAN

The invention claimed is:

1. An event notification system comprising:
an administrator terminal operated by an administrator;
a plurality of storage systems configured by including a plurality of volumes for storing data;
an event notifying client for detecting an occurrence of an event in a first volume included in the storage systems;
a management application server for obtaining information about the occurrence of the event detected by the event notifying client from the storage systems and storing it as a setting/failure information, wherein the setting/failure information is divided into screen information and audit log information, wherein the screen information corresponds to a snapshot indicating a storage configuration at the time of setting or references a snapshot indicating a status at the time of the occurrence of the failure, and wherein the audit log information corresponds to an audit log recorded at the time of setting of the storage information and information relating to the audit log; and
an event information aggregation server for creating and managing event information including an event key for uniquely associating the event with the setting/failure information;
wherein the event information includes related region information about a second volume that is an occurrence region of a related event occurring in relation to the event;
wherein the event information aggregation server notifies the administrator terminal of an event key for the created event information; and
wherein if an event key is selected by the administrator from event keys of which the event information aggregation server notified the administrator terminal, the management application server has the administrator terminal display an event browse screen showing relativity of the first volume to the second volume based on the event information including the relevant event key.

2. The event notification system according to claim 1, wherein the management application server provides the administrator terminal with the setting/failure information corresponding to the event key selected by the administrator in response to a request from the administrator terminal.

3. The event notification system according to claim 1, wherein the event information aggregation server creates the related region information based on storage configuration information indicating a storage configuration in the plurality of storage systems.

4. The event notification system according to claim 1, wherein when creating the event information for the event detected by the event notifying client, the event information aggregation server further creates event information for the related event of the relevant event.

5. The event notification system according to claim 4, wherein when deleting the event key, the event information aggregation server deletes the event information for the event associated with the relevant event key and the event information for the related event of the relevant event.

6. The event notification system according to claim 1, wherein the event notifying client and the event information aggregation server are configured inside the management application server.

7. The event notification system according to claim 1, wherein the management application server authenticates the event key before having the administrator terminal display the event browse screen.

8. The event notification system according to claim 1, wherein the event information includes information indicating relativity of the related event to the event associated with the event key; and
wherein the management application server sets a display property of the volumes displayed on the event browse screen in accordance with the relativity.

9. The event notification system according to claim 1, wherein the event notification system detects the setting of a storage configuration including the first volume or the occurrence of a failure at the first volume as the occurrence of the event.

10. An event information aggregation server connected to a plurality of storage systems configured by including a plurality of volumes, and to an administrator terminal,
wherein with respect to an event which has occurred in the volumes included in the storage systems, the event information aggregation server:
creates and manages event information including an event key for uniquely associating the event with information about the occurrence of the event; and
notifies the administrator terminal of the event key for the created event information, wherein the event information is divided into screen information and audit log information, wherein the screen information corresponds to a snapshot indicating a storage configuration at the time of setting or references a snapshot indicating a status at the time of the occurrence of the failure, and wherein the audit log information corresponds to an audit log recorded at the time of setting of the storage information and information relating to the audit log.

11. An event notification method for an event notification system, which is connected to a plurality of storage systems configured by including a plurality of volumes, for reporting an event which has occurred in the volumes included in the storage systems,
the event notification system including an administrator terminal, an event notifying client, a management application server, and an event information aggregation server, which are connected to each other via a network,
the event notification method comprising:
an event detection step executed by the event notifying client detecting the occurrence of an event in a first volume included in the storage systems;
a setting/failure information storage step executed by the management application server obtaining information about the occurrence of the detected event from the storage systems and storing it as setting/failure information, wherein the setting/failure information is divided into screen information and audit log information, wherein the screen information corresponds to a snapshot indicating a storage configuration at the time of setting or references a snapshot indicating a status at the time of the occurrence of the failure, and wherein the audit log information corresponds to an audit log recorded at the time of setting of the storage information and information relating to the audit log;

an event information creation step executed by the event information aggregation server creating and managing event information including an event key for uniquely associating the event with the setting/failure information by including related region information about a second volume that is an occurrence region of a related event occurring in relation to the event;

an event occurrence notification step executed by the event information aggregation server notifying the administrator terminal of an event key for the created event information; and an event browse screen display step executed, if an event key is selected by the administrator from event keys reported in the event occurrence notification step, by the management application server having the administrator terminal display an event browse screen showing relativity of the first volume to the second volume based on the event information including the relevant event key.

12. The event notification method according to claim 11, further comprising a setting/failure information provision step executed after the event browse display step by the management application server providing the administrator terminal with the setting/failure information corresponding to the event key selected by the administrator in response to a request from the administrator terminal.

13. The event notification method according to claim 11, wherein in the event information creation step, the event information aggregation server creates the related region information based on storage configuration information indicating a storage configuration in the plurality of storage systems.

14. The event notification method according to claim 11, wherein when creating the event information for the event detected in the event notification step, the event information aggregation server further creates event information for the related event of the relevant event in the event information creation step.

15. The event notification method according to claim 11, further comprising an authentication step executed by the management application server authenticating the event key before the event browse screen display step.

* * * * *